(12) United States Patent
Dupuis et al.

(10) Patent No.: US 6,968,055 B1
(45) Date of Patent: Nov. 22, 2005

(54) DC HOLDING CIRCUIT

(75) Inventors: Timothy J. Dupuis, Austin, TX (US); Saroj Rout, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 242 days.

(21) Appl. No.: 10/397,960

(22) Filed: Mar. 26, 2003

(51) Int. Cl.[7] .............................................. H04M 1/80
(52) U.S. Cl. ................................... 379/412; 379/93.05
(58) Field of Search ............................. 379/93.05, 412

(56) References Cited

U.S. PATENT DOCUMENTS

| | | |
|---|---|---|
| 4,224,478 A | 9/1980 | Fahey et al. |
| 4,757,528 A | 7/1988 | Falater et al. |
| 4,815,126 A | 3/1989 | Goode et al. |
| 4,975,949 A | 12/1990 | Wimsatt et al. |
| 5,020,102 A | 5/1991 | Schorr |
| 5,058,129 A | 10/1991 | Gupta et al. |
| 5,068,659 A | 11/1991 | Sakaguchi |
| 5,086,454 A | 2/1992 | Hirzel |
| 5,224,154 A | 6/1993 | Aldridge et al. |
| 5,323,398 A | 6/1994 | Wake et al. |
| 5,465,298 A | 11/1995 | Wilkison et al. |
| 5,500,894 A | 3/1996 | Hershbarger |
| 5,500,895 A | 3/1996 | Yurgelites |
| 5,506,900 A | 4/1996 | Fritz |
| 5,563,942 A | 10/1996 | Tulai |
| 5,564,984 A | 10/1996 | Mirabella et al. |
| 5,654,984 A | 8/1997 | Hershbarger et al. |
| 5,675,640 A | 10/1997 | Tappert et al. |
| 5,714,809 A | 2/1998 | Clemo |
| 5,790,656 A | 8/1998 | Rahamim et al. |
| 5,796,815 A | 8/1998 | Guercio et al. |
| RE35,901 E | 9/1998 | Wilkison et al. |
| 5,801,517 A | 9/1998 | Borle |
| 5,809,068 A | 9/1998 | Johnson |

(Continued)

FOREIGN PATENT DOCUMENTS

WO    WO99/66704    12/1999

OTHER PUBLICATIONS

Silicon Laboratories, Si3044 ; "3.3V Enhanced Global Direct Access Arrangement," Rev. 2.01; Sep. 2001; 72pgs.

(Continued)

*Primary Examiner*—Sinh Tran
*Assistant Examiner*—Daniel Swerdlow
(74) *Attorney, Agent, or Firm*—O'Keefe, Egan & Peterman, LLP

(57) ABSTRACT

DC holding circuitry that may be implemented with other parts of a DAA circuit to terminate a telephone connections at the user's end. The DC holding circuitry may be implemented using a synthesized inductor circuit powered by DC termination circuitry of a DAA telephone line circuit to provide quiet current that may be mirrored to provide the DC holding. The DC holding circuitry may be further implemented to actively steer DC holding current into multiple external transistors to share the power burden, and using an op-amp gain/feedback configuration to achieve low noise and distortion without the need for expensive capacitor-based filter and high powered transistor components. Variable biasing and active current steering may be employed to permit one or more external resistor/s to help dissipate power. The disclosed DC holding circuitry may also be implemented with a fast transient network having a single stage of fast transient filtering placed in the input network. A fast off-hook settling circuit block may also be implemented to achieve fast settling times by using an op-amp to clamp the receive pin voltage of a DAA circuit.

51 Claims, 12 Drawing Sheets

U.S. PATENT DOCUMENTS

| | | | |
|---|---|---|---|
| 5,912,513 A | | 6/1999 | Hollenbach et al. |
| 5,946,393 A | * | 8/1999 | Holcombe .................. 379/413 |
| 5,953,194 A | | 9/1999 | Atkins |
| 5,999,619 A | | 12/1999 | Bingel |
| 6,088,446 A | | 7/2000 | Huang |
| 6,091,806 A | * | 7/2000 | Rasmus et al. .......... 379/93.05 |
| 6,137,827 A | | 10/2000 | Scott et al. |
| 6,167,134 A | * | 12/2000 | Scott et al. .................. 379/412 |
| 6,188,764 B1 | | 2/2001 | Huang et al. |
| 6,198,816 B1 | | 3/2001 | Hein et al. |
| 6,201,865 B1 | | 3/2001 | Dupuis et al. |
| 6,272,220 B1 | * | 8/2001 | Kincaid ................... 379/93.05 |
| 6,275,583 B1 | | 8/2001 | Derby et al. |
| 6,385,235 B1 | | 5/2002 | Scott et al. |
| 6,498,825 B1 | | 12/2002 | Dupuis et al. |
| 6,504,864 B1 | | 1/2003 | Dupuis et al. |
| 6,516,024 B1 | | 2/2003 | Dupuis et al. |
| 6,522,745 B1 | | 2/2003 | Tuttle et al. |
| 6,618,482 B2 | * | 9/2003 | Parrott ....................... 379/412 |

OTHER PUBLICATIONS

Silicon Laboratories, Si3034; "3.3 V Global Direct Access Arrangement," Rev. 2.01; Sep. 2001; 66 pgs.

Silicon Laboratories, Si3032; "Direct Digital Access Arrangement (DDAA)," Rev. 0.8; Nov. 1997; 25 pgs.

Copending U.S. Appl. No. 10/292,290, filed Jun. 16, 1998, "Digital Access Arrangement Circuitry and Methods For Connecting To Phone Lines Having A DC Holding Circuit With Programmable Current Limiting" (SILA:040C1).

Copending U.S. Appl. No. 09/347,689, filed Jul. 2, 1999, "Digital Access Arrangement Circuitry And Method Having Current Ramping Control Of The Hookswitch" (SILA:045).

Copending U.S. Appl. No. 10/400,183, filed Mar. 26, 2003, "Fast Transient Filter And Fast Off-Hook Settling Network For A DC Holding Circuit" (SILA:151).

* cited by examiner

DC HOLDING CIRCUIT

TECHNICAL FIELD OF THE INVENTION

This invention relates to the field of digital access arrangement circuitry. More particularly, this invention relates to DC holding circuitry used with digital access arrangement circuitry.

BACKGROUND

Direct Access Arrangement (DAA) circuitry may be used to terminate the telephone connections at a phone line user's end to provide a communication path for signals to and from the phone lines. DAA circuitry includes the necessary circuitry to terminate the telephone connections at the user's end and may include, for example, an isolation barrier, DC termination circuitry, AC termination circuitry, ring detection circuitry, and processing circuitry that provides a communication path for signals to and from the phone lines. Examples of DAA circuitry known in the art may be found described in U.S. Pat. No. 6,385,235 and in U.S. patent application Ser. No. 09/347,688 filed Jan. 2, 1999 and entitled "DIGITAL ACCESS ARRANGEMENT CIRCUITRY AND METHOD HAVING A SYNTHESIZED RINGER IMPEDANCE FOR CONNECTING TO PHONE LINES" by Tuttle et al., the disclosure of each being incorporated herein by reference.

Generally, governmental regulations specify the telephone interface requirements and specifications for a variety of parameters including AC termination, DC termination, ringer impedance, ringer threshold, etc. For example, Federal Communications Commission (FCC) Part 68 governs the interface requirements for telephones in the United States. However, the interface requirements world wide are not standardized, and thus, in countries other than the United States the applicable standards may include the TBR21, NET4, JATE, and various country specific PTT specifications. Because the interface requirements are not standardized from country to country, often different DAA circuitry is required for use in each country in order to comply with the appropriate standard. The requirement for different DAA circuitry, however, limits the use of one phone line interface in a variety of countries. Thus, for example, a modem in a laptop computer configured for interfacing with a phone line in one country may not necessarily operate properly in another country. Further, the requirement for different DAA circuitry in various countries hinders the design of a single integrated cost effective DAA solution for use world wide.

As mentioned above, the telephone interface requirements generally include specifications for DC termination of the telephone line. For example, the DC impedance that the DAA circuitry presents to the telephone line (typically ≦300 Ω) may be required by regulations to be less than the AC impedance that the DAA circuitry presents to the telephone line (typically ≈600 Ω). Consequently, inductive behavior is required from the section of the DAA circuitry that sinks DC loop current, which is typically called the DC termination or DC holding circuitry. This inductive behavior of the DC holding circuitry should provide both high impedance and low distortion for voiceband signals. The DC termination specifications may also include limits for the maximum current and power dissipation. For example, the TBR-21 specification requires the DC holding circuit to limit DC current to less than 60 mA with a maximum power dissipation of approximately 2 watts. Examples of DC holding circuitry known in the art may be found described in U.S. Pat. No. 6,201,865, the disclosure of which is incorporated herein by reference. The design of a DC holding circuit for use with multiple standards may be complicated in that the various international specifications may conflict with regards to off-hook settling times and pulse dialing templates (which may require fast settling time constants) and high speed interface designs (such as for use in modems) which require very low frequency operation (i.e. approximately as low as 10 Hz). Furthermore, it is desirable to implement such DC holding circuits in a manner that does not cause excessive distortion at low and high frequencies.

In order to pass homologation for many European countries, DAA circuitry must pass a "fast transient" test. In such a test, the tip and ring are capacitively couple to a signal line that has very fast switching transients at high voltage. To pass the test, the modem should not drop the connection in the presence of this interference. During a fast transient test, the DC holding circuit of the DAA circuitry may be disturbed by the fast switching transients. It may require a relatively long time (e.g.; seconds) to resettle the DC holding circuitry, resulting in dropped modem connections. This may be illustrated with reference to FIGS. 4 and 5.

FIG. 4 is a simplified schematic that illustrates components of a prior art fast transient network 400 that employs only one stage of fast transient filtering, and shows a fast transient filter circuit block 410 and DC holding current ($I_{DCHOLD}$). The fast transient network components illustrated in FIG. 4 include capacitor C41, resistors R41 and R42, and op amp OA41. As shown in FIG. 4, voltage V1 is present at the line side node between fast transient filter circuit block 410 and resistor R42, voltage V2 is present at the node between fast transient filter circuit block 410 and capacitor C41, and voltage V3 is present at the node between capacitor C41, resistor R41 and op amp OA41. For the simplified schematic of FIG. 4, the relationship between voltages V1, V2 and V3, and DC holding current ($I_{DCHOLD}$) may be approximated using the following relationships:

$$V2 = V1(1/(1+s\tau_1));$$

$$V3 = V2[s\tau_2/(1+s\tau_2)];$$

and $$I_{DCHOLD} = V1/R42[1-(1/(1+s\tau_1))(s\tau_2/(1+s\tau_2))]$$

where:

$\tau_1$ = Fast Transient Filter ≈ $1/2\pi(40$ khz$)$ $\tau_2$ = DC Holding Frequency ≈ $1/2\pi(1$ hz$)$ FIG. 5 illustrates the prior art relationship between DC holding current and frequency for the simplified fast transient network of FIG. 4 that employs only one stage of fast transient filtering. As shown in FIG. 5, the error in DC hold at high frequencies may be sufficient to cause the DAA to fail AC termination tests for return loss in some countries.

SUMMARY OF THE INVENTION

Disclosed herein is DC holding circuitry that may be implemented with other parts of a DAA circuit to terminate the telephone connections at the user's end. As so implemented, the disclosed DC holding circuitry may be employed to permit electronic control over the DC I–V curves and programmable current limiting, to allow fast settling times and/or to achieve low noise/distortion. Advantageously, the disclosed DC holding circuitry may be implemented in one embodiment to achieve low noise and distortion by steering DC holding current into multiple external transistors and by using an op-amp gain/feedback configuration that eliminates the need for expensive capacitor-based filter and high powered transistor components such as typically employed in single transistor current steering configurations. In another embodiment, the disclosed DC holding circuitry may be implemented with a fast transient network that makes possible the use of single stage fast transient filtering, saving the cost and complexity associated with multiple stage fast transient filter configurations.

The disclosed systems and methods may be implemented in one embodiment to provide a non-filtered and/or high bandwidth current routing circuit that is configured to actively and selectively steer DC current into multiple components in order to maximize power handling capability of the system. In further embodiments, the disclosed current routing circuit may be configured to be programmable to provide compatibility with two or more different international telephone interface standards, and/or the disclosed current routing circuitry may include a synthesized inductor for sensing current.

In one respect, the disclosed DC holding circuitry may be implemented to provide desired DC holding by using a synthesized inductor circuit powered by DC termination circuitry of a DAA telephone line circuit to provide quiet current that may be mirrored to provide DC holding.

In another respect, the disclosed DC holding circuitry may be implemented to actively steer DC holding current into multiple external transistors to share the power burden in an equal or substantially equal manner. The disclosed DC holding circuitry may be further implemented to employ variable biasing and active current steering to permit one or more external resistor/s to help dissipate power.

In another respect, the disclosed DC holding circuitry may be implemented with a fast transient network having a fast transient filter circuit block placed in the input network. In one embodiment, the fast transient network may advantageously employ only one stage of fast transient filtering. A fast off-hook settling circuit block may also be implemented to achieve fast settling times by using an op-amp to clamp the voltage of a receive input of a DAA circuit to a set voltage value.

In another respect, disclosed herein is a communication system, including: phone line side circuitry that may be coupled to a telephone network; and a DC holding circuit within the phone line side circuitry, the DC holding circuit including resistor-based current mirror circuitry having at least one op-amp.

In another respect, disclosed herein is a communication system, including: phone line side circuitry that may be coupled to a telephone network; powered side circuitry that may be coupled to the phone line side circuitry through an isolation barrier; and a DC holding circuit within the phone line side circuitry, the DC holding circuit including non-filtered current mirror circuitry and a synthesized inductor circuit. In one embodiment, the synthesized inductor circuit may be a single op-amp synthesized inductor circuit.

In another respect, disclosed herein is a method of operating a communication system that may be coupled to a telephone network, including: providing phone line side circuitry that includes a DC holding circuit and at least one DC termination pin configured to be coupled to the telephone network, the DC holding circuit including resistor-based current mirror circuitry having at least one op-amp and having at least one resistor operably coupled to the DC termination pin; and selectively discharging DC holding current from the DC termination pin through the at least one resistor of the resistor-based current mirror circuitry.

In another respect, disclosed herein is a method of operating a communication system that may be coupled to a telephone network, including: providing phone line side circuitry that includes a DC holding circuit and that has a receive side pin and a first DC termination pin each configured to be coupled to the telephone network, the DC holding circuit including non-filtered current mirror circuitry and a synthesized inductor circuit; and selectively discharging DC holding current from the DC termination pin.

In another respect, disclosed herein is a communication system, including: phone line side circuitry that may be coupled to a telephone network; and a DC holding circuit within the phone line side circuitry, the DC holding circuit including fast transient filter circuitry coupled within an input network of the DC holding circuit.

In another respect, disclose herein is a communication system, including: phone line side circuitry that may be coupled to a telephone network; and a DC holding circuit within the phone line side circuitry, the DC holding circuit including fast off-hook settling circuitry.

In another respect, disclosed herein is a method of operating a communication system that may be coupled to a telephone network, including: providing phone line side circuitry that includes a DC holding circuit; and filtering fast transient events within an input network of the DC holding circuit.

In another respect, disclosed herein is a method of operating a communication system that may be coupled to a telephone network, including: providing phone line side circuitry that includes a DC holding circuit; and clamping the voltage of a receive side pin of the DC holding circuit upon occurrence of a fast off hook transient event.

DESCRIPTION OF THE DRAWINGS

So that the manner in which the herein described advantages and features of the present invention, as well as others which will become apparent, are attained and can be understood in detail, a more particular description of the invention summarized above may be had by reference to the embodiments thereof which are illustrated in the appended drawings, which drawings form a part of this specification.

It is noted, however, that the appended drawings illustrate only exemplary embodiments of the invention and are therefore not to be considered limiting of its scope, for the invention may admit to other equally effective embodiments.

DESCRIPTION OF ILLUSTRATIVE EMBODIMENTS

Figure 1:
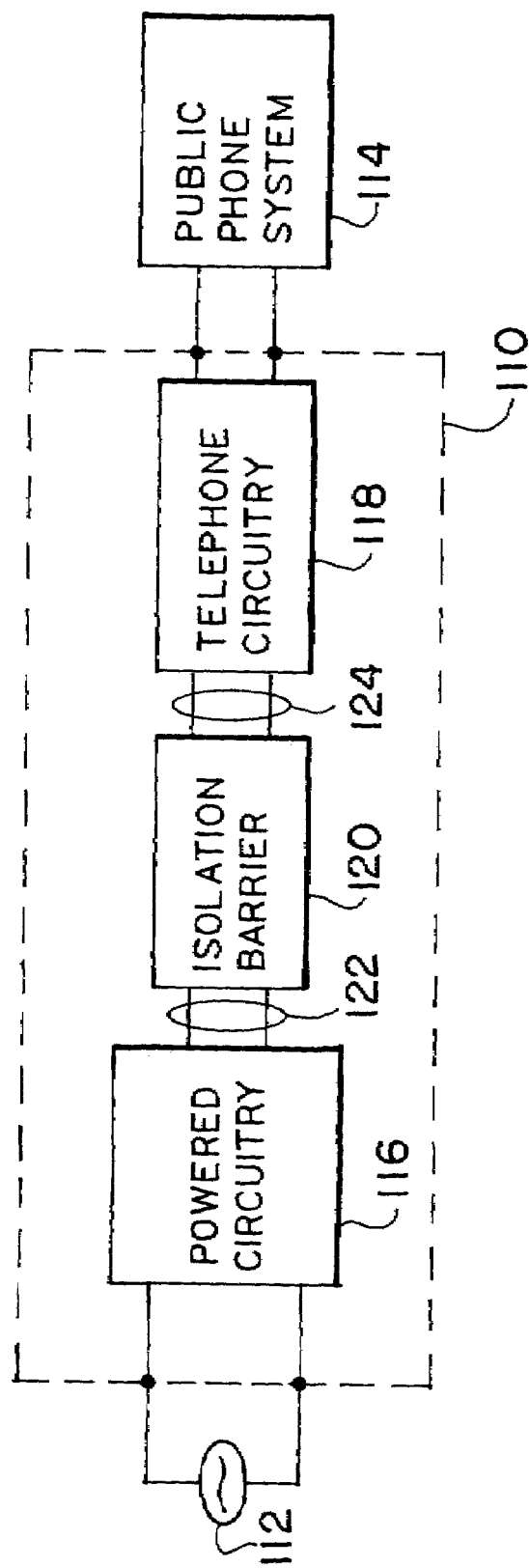
FIG. 1 is a block diagram of a telephone line connection circuitry according to one embodiment of the disclosed systems and methods.
Figure 2:
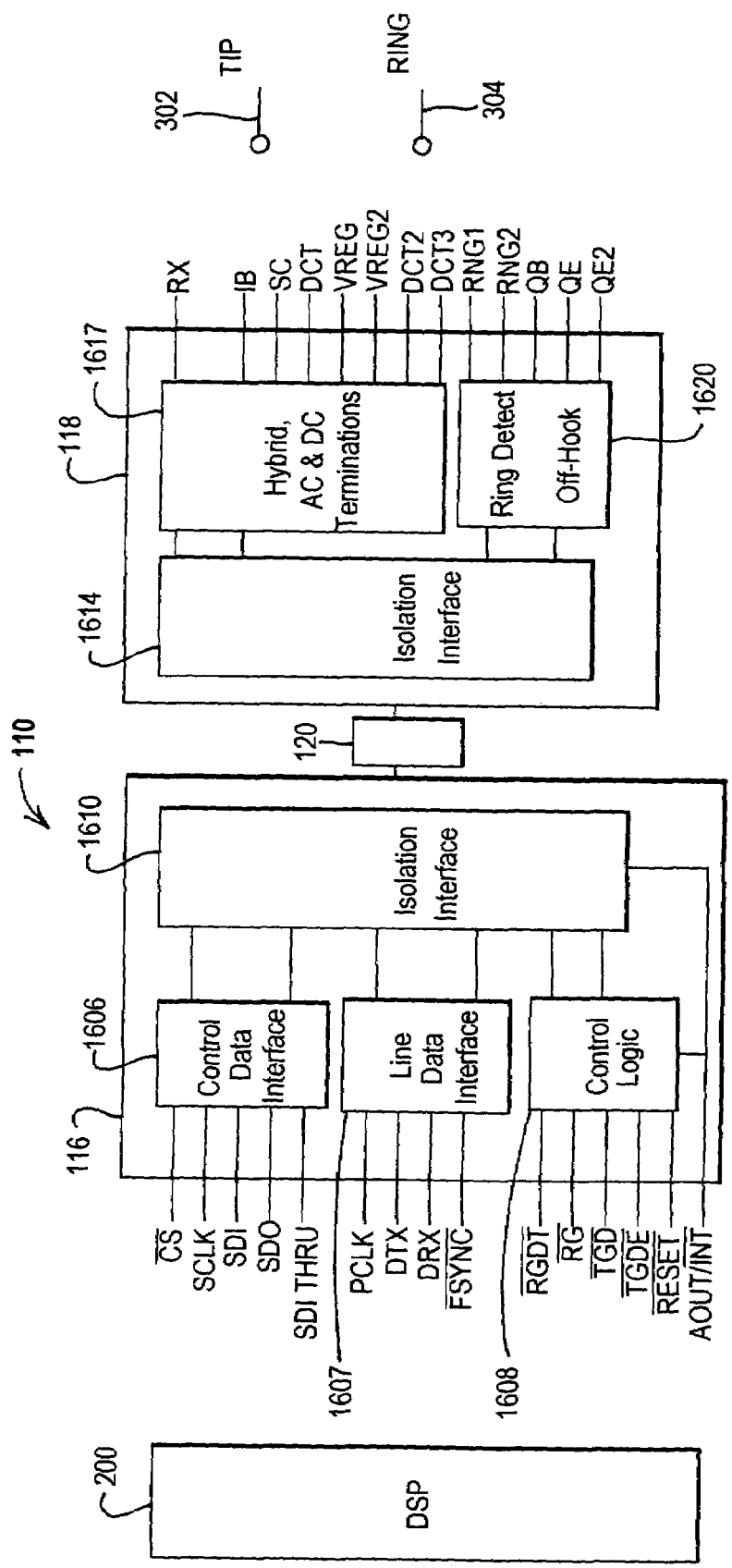
FIG. 2 is a general block diagram of digital DAA circuitry including phone line side circuitry, an isolation barrier, and powered side circuitry according to one embodiment of the disclosed systems and methods.

In order to provide a context for understanding this description, FIG. 2 illustrates a typical application for the present invention: circuitry that includes circuitry powered by a source external to the phone system. A basic telephone line side circuit 118 is connected to the public telephone system and does not have a separate power connection. DAA circuitry 110 for coupling to a phone line may be used with or incorporated within devices including, but not limited to, radio (cordless), modem, speakerphone, and answering machine devices that may require an external source of power 112, typically obtained by plugging the phone (or a power supply transformer/rectifier) into a typical 110-volt residential wall outlet. In order to protect public phone system 114 (and to comply with governmental regulations), it is necessary to isolate "powered circuitry" 116 that is externally powered from "isolated circuitry" 118 (isolated circuitry may also be called telephone line side circuit) that is connected to the phone lines, to prevent dangerous or destructive voltage or current levels from entering the phone system (similar considerations exist in many other applications as well, including communication, medical and instrumentation applications in which this invention may be beneficially applied). The required isolation is provided by isolation barrier 120. The signal that passes through the isolation barrier 120 may be a digital or analog signal. In some applications, communication across isolation barrier 120 may be unidirectional (in either direction), but in many applications, including telephony, bidirectional communication is required. Bidirectional communication may be provided using a pair of unidirectional isolator channels, or by forming a single isolation channel and multiplexing bidirectional signals through the channel. The primary requirements placed on isolation barrier 120 are that it effectively prevents harmful levels of electrical power from passing across it, while accurately passing the desired signal from the powered side 122 to the isolated side 124, or in the reverse direction if desired.

FIG. 2 is a general block diagram of digital DAA circuitry 110 including telephone line side circuit 118, an isolation barrier 120, and powered side circuitry 116 according to the present invention. The isolation barrier 120 may include any device or combination of devices suitable for providing the required isolation, and also allowing for the transmission of digital information between the isolation interface 1614 in the phone line side circuitry and the isolation interface 1610 in the powered side circuitry. In this regard, isolation barrier 120 may include, for example, one or more capacitors, one or more transformers, opto-isolators, combinations thereof, etc. The telephone line side circuit 118 may be connected to phone lines of a telephone network system (e.g., public telephone system, PBX network, etc.), and the powered side circuitry 116 may be connected to external controllers (e.g., including, but not limited to, digital signal processor (DSP) 200) that may be part of a communication device, such as a phone or modem. Further exemplary details on coupling powered side circuitry to a DSP may be found illustrated and described in relation to the exemplary embodiment of FIG. 9.

The powered side circuitry 116, which may be implemented as an integrated circuit (IC), may communicate with the external controller through a control data interface 1606, a line data interface 1607 and control logic 1608. In addition, the control data interface 1606, line data interface 1607 and the control logic 1608 are connected to the isolation interface 1610 so that control, status, signal and other desired information may be transmitted to and received from the telephone line side circuit 118 across the isolation barrier 120.

In the embodiment depicted, the control data interface 1606 and line data interface 1607 may have a number of external pins providing a serial port interface to the external controller, such as serial port data input pin (SDI) for providing serial port control data input, serial port data output pin (SDO) for providing serial port control data output, serial port bit clock input pin (SCLK) for controlling the serial data on SDO and for latching the data on SDI, chip select input pin (CS_bar) (it is noted that the suffix "_bar" is used to denote a signal that is typically asserted when at a low logic level) for providing an active low input control signal that enables the SDI Serial port (when inactive, SCLK and SDI are ignored and SDO is high impedance), SDI passthrough output pin (SDITHRU) for providing cascaded SDI output signal to daisy-chain the SPI interface with additional devices, master clock input pin (PCLK) for providing a master clock input, transmit PCM or GCI highway data output pin (DTX) for outputting data from either the PCM or GCI highway bus, receive PCM or GCI highway data input pin (DRX) for receiving data from either the PCM or GCI highway bus, and frame sync input pin (FSYNC_bar) for providing a data framing signal that is used to indicate the start and stop of a communication/data frame.

Similarly, the control logic 1608 may have a number of external pins providing control and status information to and from the external controller, such as ring detect output pin (RGDT_bar) for producing an active low rectified version of the ring signal, ring ground output pin (RG_bar) for providing a control signal for ring ground relay, (may be used to support ground start applications), TIP ground detect input pin (TGD_bar) for detecting current flowing in TIP for supporting ground start applications, TIP ground detect enable output pin (TGDE_bar) for providing a control signal for the ground detect relay (may be used to support ground start applications), reset input pin (RESET_bar) for providing an active low input that may be used to reset all control registers to a defined initialized state (may also be used to bring powered side circuitry 116 out of sleep mode), and analog speaker output/interrupt output pin (AOUT/INT) for providing an analog output signal for driving a call progress speaker in AOUT mode (alternatively may be set to provide a hardware interrupt signal).

The telephone line side circuit 118, which may be implemented as an integrated circuit (IC), may communicate with the phone lines through hybrid, AC and DC termination circuitry 1617 (the DC termination circuitry also provides an internal power supply voltage), and determine ring-detect and off-hook status information through off-hook/ring-detect block 1620. In addition, the hybrid, AC and DC termination circuitry 1617 and the off-hook/ring-detect block 1620 are connected to the isolation interface 1614 so that control, status, signal and other desired information may be transmitted to and received from the powered side circuitry 116 across the isolation barrier 120.

In the embodiment depicted, the hybrid portion of hybrid, AC and DC termination circuitry 1617 has a receive input pin (RX) for providing the receive side input from the telephone network, an internal bias pin (IB) for providing a bias voltage to the device, a SC Connection pin (SC) for enabling an external transistor network, DC termination pins (DCT, DCT2 and DCT3) for providing DC termination to the telephone network, a voltage regulator pin (VREG) for connecting to an external capacitor to provide bypassing for an internal power supply, and a voltage regulator 2 pin (VREG2) for connecting to an external capacitor to provide bypassing for an internal power supply.

The off-hook/ring-detect block 1620 may have external input pins allowing status information to be provided concerning phone line status information (RNG1, RNG2), such as ring and caller identification signals. For example, the first ring detect pin (RNG1) may connect to the tip (T) lead 302 of the phone line through a resistor, and the second ring detect pin (RNG2) may connect to the ring (R) lead 304 of the phone line through a resistor. Further exemplary details on coupling a telephone line circuit to tip and ring leads of a phone line may be found illustrated and described in relation to the exemplary embodiment of FIG. 7. In addition, off-hook/ring-detect block 1620 may have external transistor emitter output pins (QE, QE2) and transistor base pin (QB) that control external off-hook circuitry to enter, for example, an off-hook state or a limited power mode to get caller identification information. More particularly, the transistor emitter output pins (QE, QE2) may be connected to respective emitters of bipolar transistors within external hook-switch circuitry, and the transistor base output pin (QB) may be connected to a base of a bipolar transistor within external hook-switch circuitry.

A variety of characteristics of a DAA may be programmable in order to achieve compliance with a variety of regulatory standards. Thus, the DC termination characteristics, AC termination characteristics, ringer impedance, or billing tone detector of the DAA circuitry 110 may be programmable in order to achieve compliance with a variety of regulatory standards. For example, standard FCC DC termination requirements, the DC current limiting requirements of French and TBR21 standards, or the low voltage requirements of Japan, Italy, Norway, and other countries may be programmable obtained. A prior art programmable DC holding circuit is described in U.S. Pat. No. 6,201,865 which is incorporated herein by reference.

Figure 3:
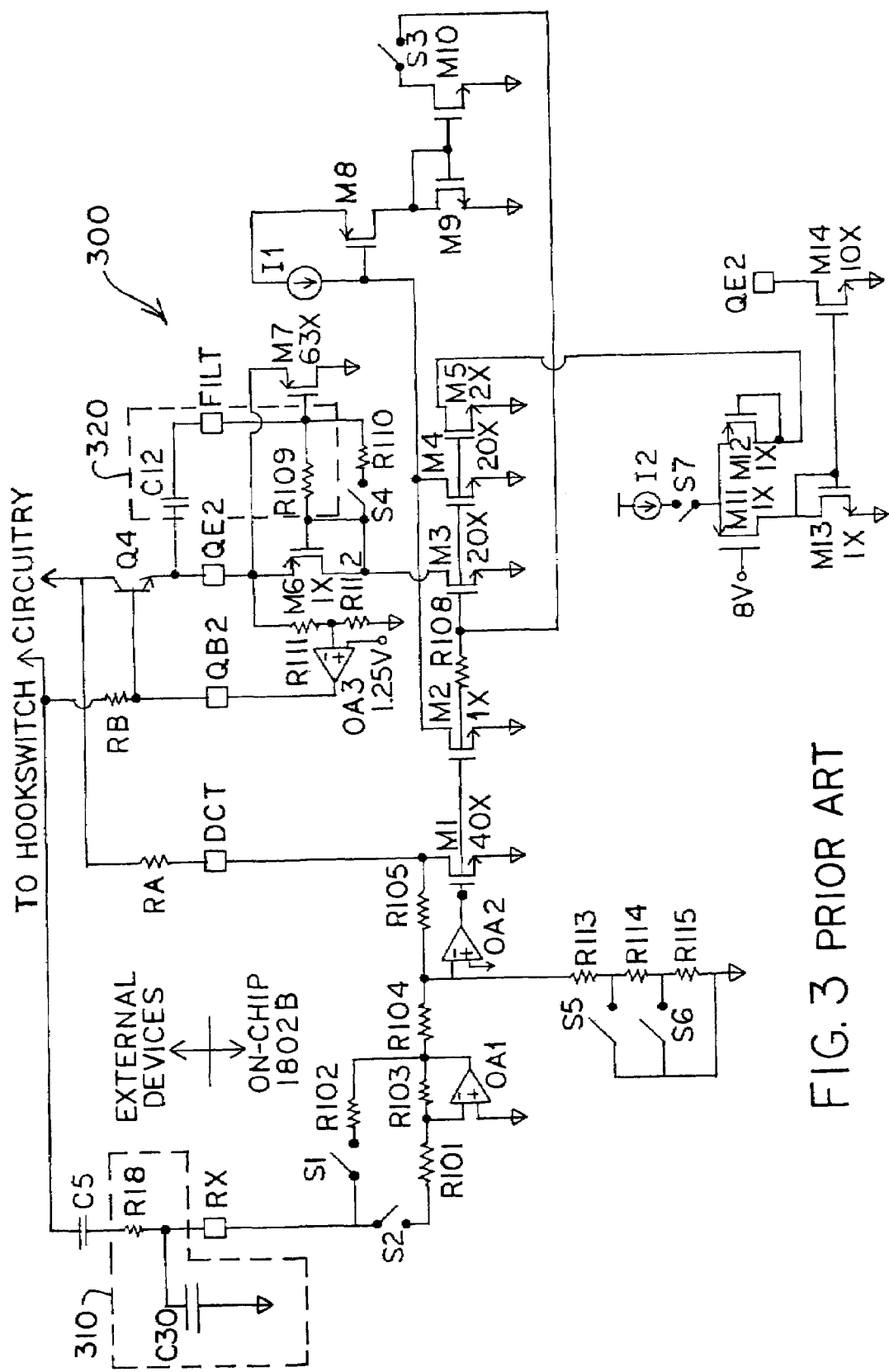
FIG. 3 is a circuit diagram of a prior art DC holding circuit.

FIG. 3 is a circuit diagram illustrating an example of a prior art DC holding circuit 300, the description and implementation of which is further described in U.S. Pat. No. 6,201,865 which has been incorporated herein by reference. FIG. 3 includes circuitry both internal and external to a phone side integrated circuit, and may be implemented to permit electronic control over the DC I–V curves and programmable current limiting, to allow fast settling times and to achieve low noise/distortion. More particularly, FIG. 3 includes RX, DCT, QB2, QE2, and FILT2 pins and associated internal and external circuits (the hookswitch circuitry is not being shown). As shown in FIG. 3, the DC holding circuit 300 includes switches S1, S2, S3, S4, S5, S6, and S7. These switches may be utilized to select the current limiting or non-current limiting modes of operation, to switchable operate the DC holding circuit in order to achieve fast settling times and low frequency operation and to select low voltage modes of operation.

As illustrated, the prior art circuit 300 of FIG. 3 utilizes an external transistor Q4 that is controlled so that in the current limiting mode of operation current may be steered to both resistors RA and RB (which may each be formed from multiple resistors) so that power may be dissipated external to the integrated circuit. Transistor Q4 is typically a high power (e.g.; approximately 1W) external transistor Q4 which is relatively expensive. Portions of prior art DC holding circuit 300 operate in both current limiting and non-current limiting modes as a second order (two pole) system with external capacitors C12 and C5 affecting the frequency of the poles. In this regard, capacitor C12 is typically a relatively expensive tantalum capacitor exhibiting characteristics of low leakage and low vibration.

In the prior art DC holding circuit 300 of FIG. 3, two stages of fast transient filtering are employed. For the first filtering stage, a first fast transient filter circuit block 310 includes a RC filter formed by resistor R18 and capacitor C30, and serves as a low pass filter to reject fast transient glitches. In the absence of first fast transient filter circuit block 310, fast transient glitches may cause the node of receive input pin (RX) to go above or below the supply rails, turning on protection diodes (not shown) to discharge holding capacitor C5 and disturbing DC holding circuit 300. For the second filtering stage, a second fast transient filter circuit block 320 includes a RC filter formed by resistor R109 and capacitor C12. Capacitor C12 provides filtering of both noise and distortion components and second fast transient circuit block 320 has a low time constant of about 0.3 hz. Due to threshold voltage mismatches, MOS current mirrors give rise to second order distortion. In operation of DC holding circuit 300, noise from op-amps in DC holding circuit 300 is filtered and MOS current mirrors may be employed since distortion terms are filtered.

Figure 4:
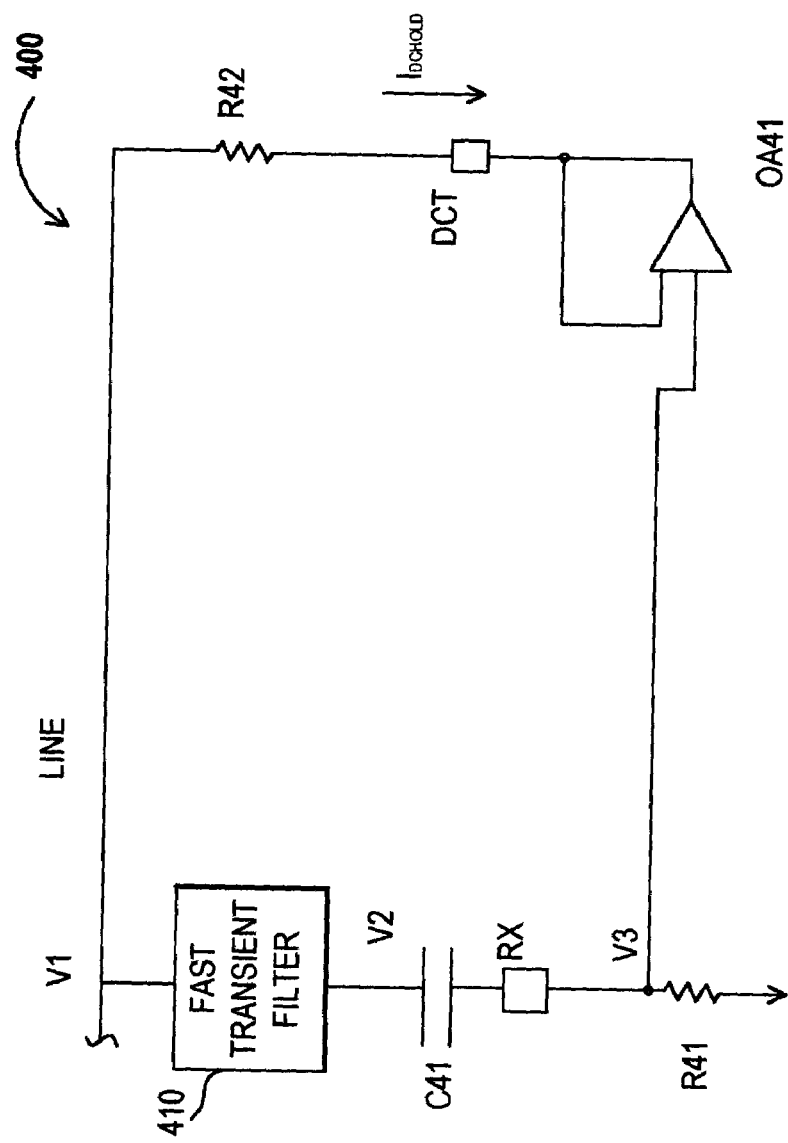
FIG. 4 is a simplified circuit diagram of a prior art fast transient network employing one stage of fast transient filtering.
Figure 5:
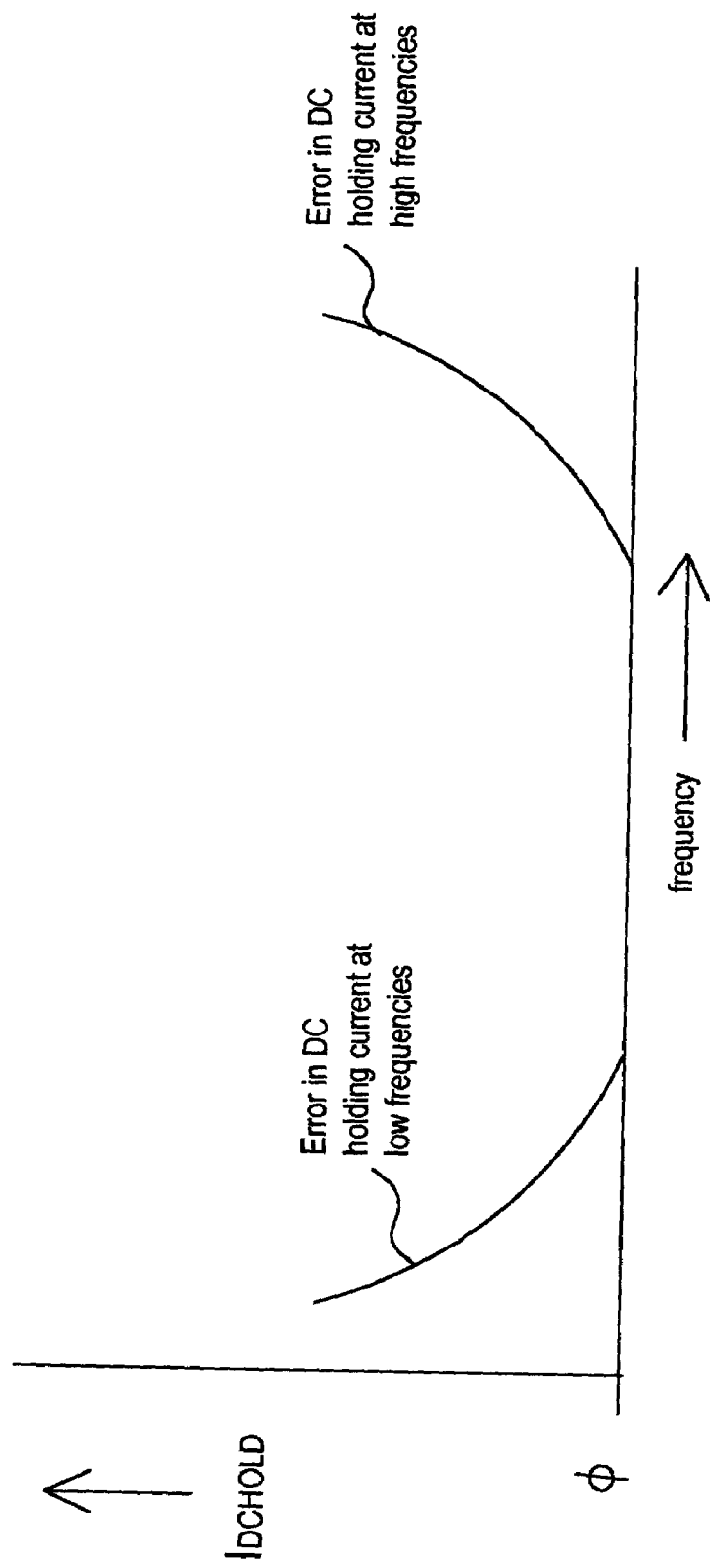
FIG. 5 illustrates relationship between DC holding current and frequency for the simplified prior art fast transient network of FIG. 4.

In operation of DC holding circuit 300, first fast transient filter circuit block 310 filters high frequency input signals, however this is not a significant problem for the input receive circuit because the filter bandwidth may be set at greater than 10 times the maximum signal bandwidth. However, in the absence of the second stage filtering of second fast transient filter circuit block 320, first fast transient filter circuit block 310 may have another effect on DC holding circuit 300 that has been previously described in reference to FIGS. 4 and 5, and resulting errors in DC hold at high frequencies may be sufficient to cause the DAA to fail AC termination tests. In prior art DC holding circuit 300 of FIG. 3, the second stage fast transient filtering characteristics of second fast transient filter circuit block 320 addresses this problem. However, as previously described, capacitor C12 of second fast transient filter circuit block 320 is typically a relatively expensive tantalum capacitor.

Figure 6A:
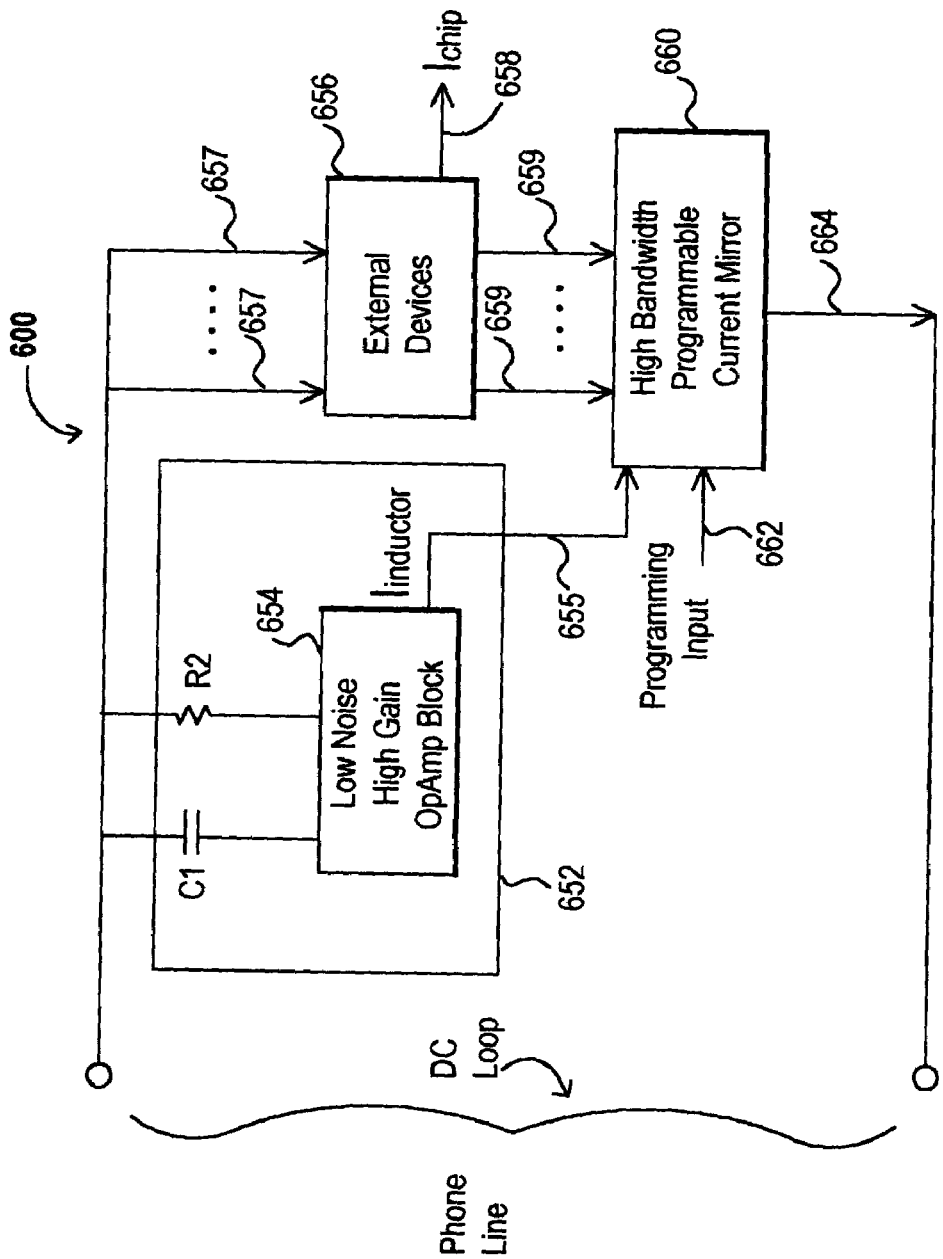
FIG. 6A is a conceptual block diagram of a DC holding circuit according to one embodiment of the disclosed systems and methods.

A conceptual view of a DC holding circuit according to the present disclosure may be seen with reference to FIG. 6A. As shown in FIG. 6A, a DC holding circuit 600 may be provided. The DC holding circuit may be coupled directly or indirectly to phone lines such as the standard TIP and RING lines. The DC holding circuit 600 may provide the DC line termination characteristics. In addition to a DC loop current as shown, a DC current $I_{CHIP}$ as shown may be utilized to provide DC current source for use during operation of a DAA line side integrated circuit.

The DC holding circuit may include a synthesized inductance circuit 652. The synthesized inductance circuit operates to provide a large inductance value for use in the DC holding circuit 600. The exemplary synthesized inductance circuit 652 includes a capacitor C1, a resistor R2, and a low noise/distortion high gain opamp block 654. The opamp block 654 may include an opamp and surrounding circuitry. In operation, the synthesized inductance circuit operates as a resistance in series with a large inductance, for example, approximately 1–2 henries. In this fashion a large inductance may be synthesized as opposed to utilizing a large discrete inductor. The synthesized inductance circuit 652 acts to block the AC components on the phone line and pass a DC current $I_{INDUCTOR}$ from the synthesized inductance circuit 652.

The opamp block 654 may be formed within a line side DAA integrated circuit. The external devices block 656 may include a plurality of devices such as transistors and resistors that are formed external to the line side DAA integrated circuit. These devices may be coupled to the phone lines through one or more lines 657 and may also be used to provide the $I_{CHIP}$ current to the line side DAA integrated circuit. The external device block is also coupled through two or more current lines 659 to a high bandwidth programmable current mirror 660. The current mirror 660 operates to mirror the $I_{INDUCTOR}$ current to the current lines 659. The DC currents provided to the current mirror 660 are then coupled back to the phone line through a current output 664. The high bandwidth programmable current mirror 660 may formed within the line side DAA integrated circuit. The current mirror 660 may be programmable through a programming input 662. In this fashion, the amount of mirror currents provided through current lines 659 may be adjustable.

In operation, the DC holding circuit 600 provides a DC Loop current from one phone line to the other which is formed by the $I_{INDUCTOR}$ current 655 together with its mirrored currents from the external devices 656 on current lines 659. The $I_{INDUCTOR}$ DC current may be approximately the voltage on the phone line divided by the value of R2 (for example 1.6K Ω). The current mirror ratios may then be set to present an equivalent impedance to the phone line of approximately 50 Ω in a typical FCC application. The programmability of the current mirrors, however, allows for the impedance to be adjusted to meet the particular application requirements. For example, a variety of international DC termination characteristics may be satisfied by programming the amount of current that is mirrored in the current mirror block 660. In one exemplary embodiment the equivalent impedance seen at the phone line may be adjusted upward to approximately 2000 Ω. Furthermore, the impedance presented to the phone line may be programmed depending upon the DC loop current itself. Thus, current limiting standards may be satisfied be adjusting the impedance upward (for example providing a 2000 Ω impedance to the phone line when the current exceeds approximately 40 mA).

As mentioned above, the external device block 656 may by utilized to provide an operating current $I_{CHIP\ 658}$ for the line side DAA integrated circuit. However, the external device block 656 also functions to allow for off-chip power dissipation through the external devices. Thus, power dissipation within the line side DAA integrated circuit may be lessened. Moreover, the external devices block 656 may be formed by a plurality of external devices (such as transistors and resistors) that provide current on the current lines 659 such that one single high power device does not have to dissipate all of the external power. In this manner, current may be steered amongst the plurality of external devices to optimize the off-chip power dissipation by sharing power dissipation amongst multiple external components. By sharing power dissipation amongst multiple off-chip devices, the power requirements of the off-chip devices may be lessened thus providing a potential cost savings.

Thus, a DC holding circuit having a large synthesized inductance is provided. This circuit may be formed with components internal and external to the line side DAA integrated circuit. The circuit may be programmable to satisfy multiple DC termination standards by utilizing a programmable current mirror. Further, external devices are provided to allow for off-chip power dissipation. In addition, the use of multiple external devices allows for sharing of the external power dissipation load.

Low Noise/Distortion DC Holding Circuit

Figure 6B:
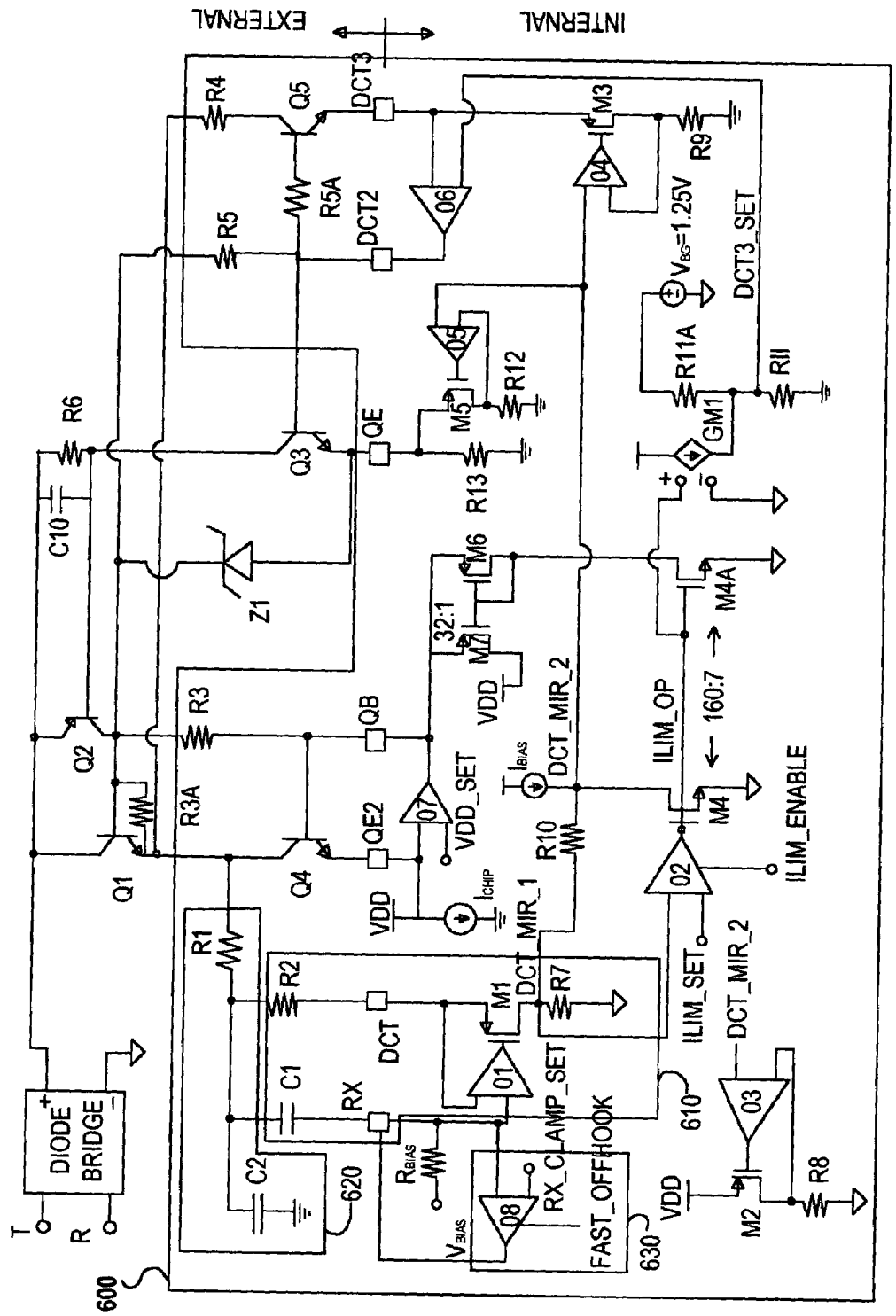
FIG. 6B is a circuit diagram of a DC holding circuit according to one embodiment of the disclosed systems and methods.
Figure 9A:
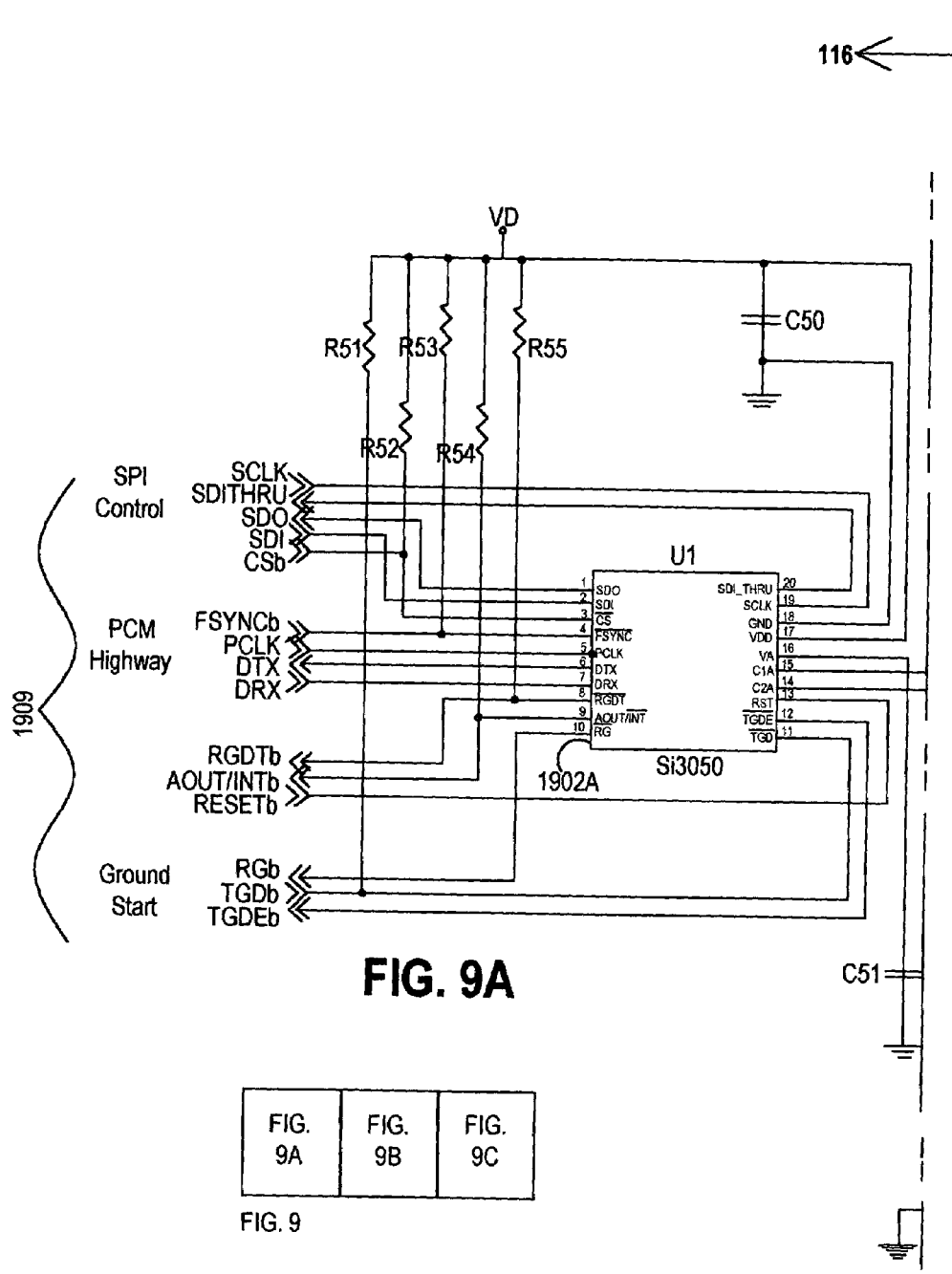
FIG. 9 is a general circuit diagram of digital DAA circuitry implemented with the DC holding circuit of FIG. 6B according to one embodiment of the disclosed systems and methods.
Figure 9B:
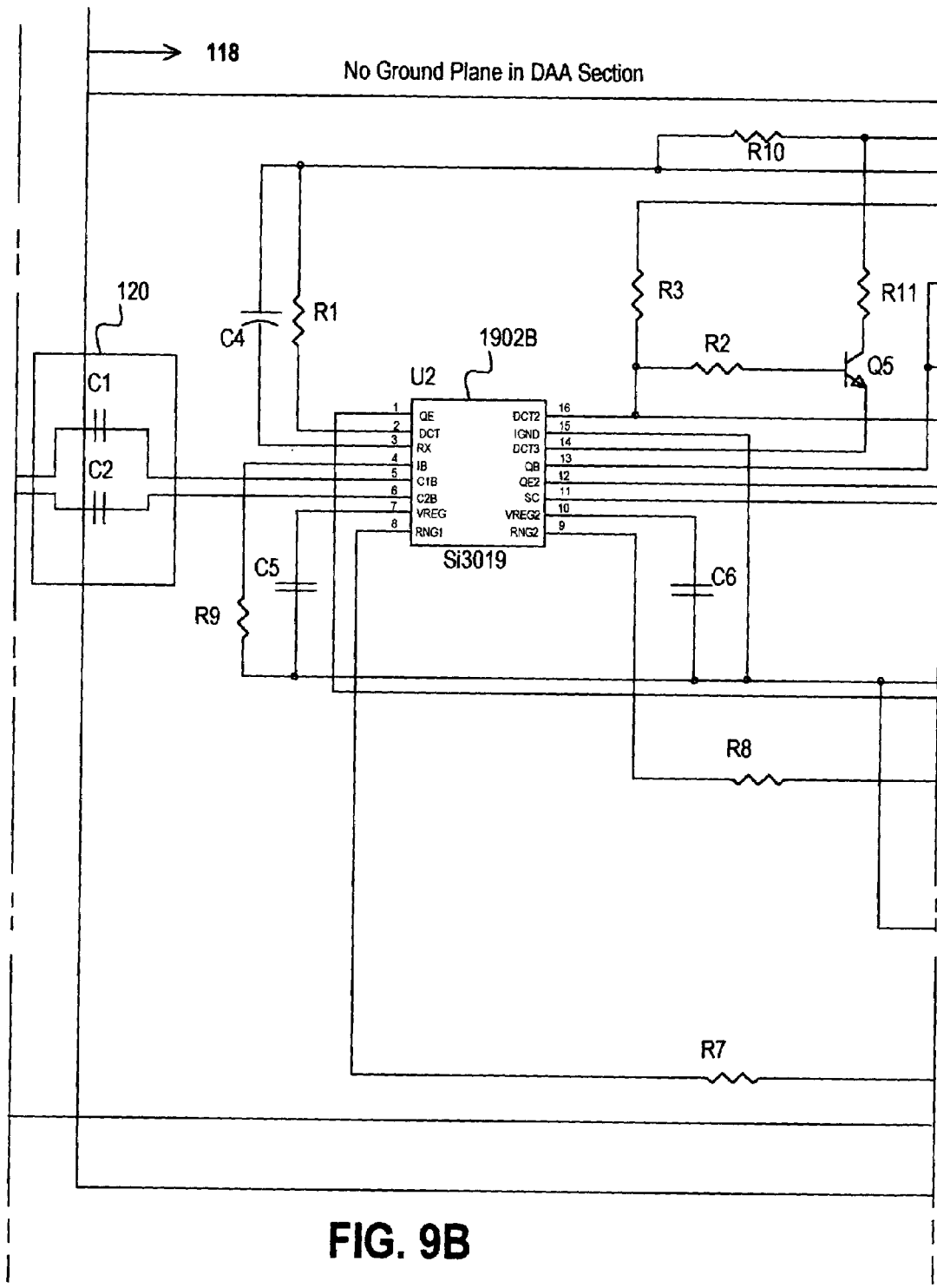
Figure 9C:
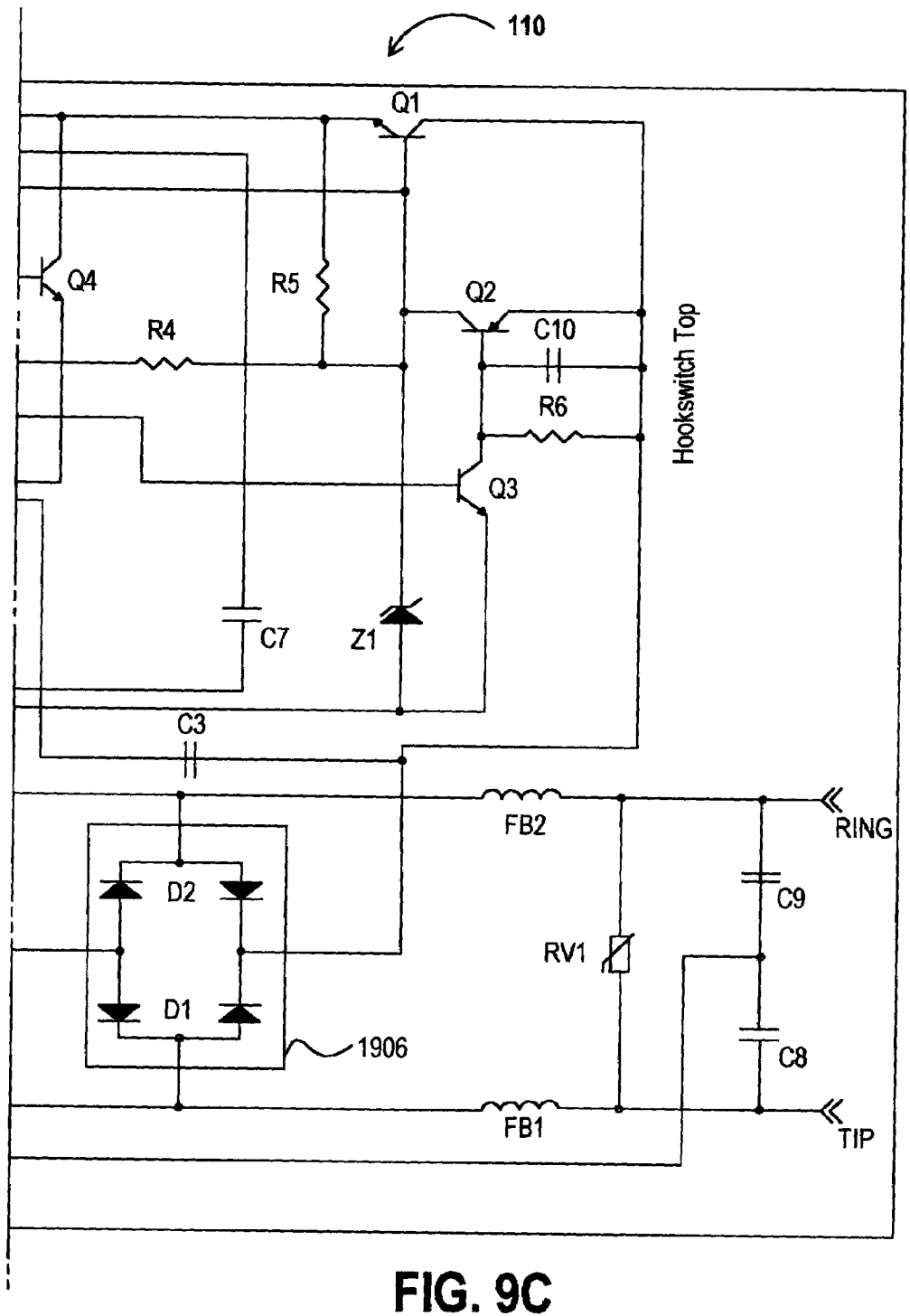

FIG. 6B illustrates one exemplary embodiment of a DC holding circuit 600 of the disclosed systems and methods that may be advantageously employed to implement the DC termination characteristics described elsewhere herein. In this regard, DC holding circuit 600 may be implemented with other parts of a DAA circuit, for example, an integrated circuit embodiment of phone line circuitry 118 of FIG. 2. As can be seen, FIG. 6B includes circuitry both internal and external to the integrated circuit of phone line circuitry 118. More particularly, FIG. 6B includes the RX, DCT, QE2, QB, QE, DCT2 and DCT3 pins and associated internal and external circuits. One DAA embodiment including a more detailed circuit of the external device is shown in FIG. 9. However, for ease of illustration, the low noise/distortion improvements provided within this disclosure will be discussed with reference to FIG. 6B. As will be described further below, DC holding circuit 600 may be implemented to permit electronic control over the DC I–V curves and programmable current limiting, to allow fast settling times and to achieve low noise/distortion.

In the DC holding circuit embodiment of FIG. 6B, distortion associated with MOS current mirrors is addressed by using a resistor-based current mirror (e.g., employing resistors R7, R8, R9 and R12) and additional op-amps O3 and O4 which employ gain and feedback to achieve substantially linear or near linear operation without requiring a second filtering stage (e.g., such as second fast transient filter circuit block 320 of prior art DC holding circuit 300 of FIG. 3). In this regard, use of a resistor-based current mirror configuration helps decrease distortion in mirrored current and may be implemented in one embodiment as part of a non-filtered and high bandwidth (i.e., greater than the voice operating frequency, or greater than about 3.2 khz in one embodiment) current routing circuit that is configured to steer DC current into multiple components in order to maximize power handling capability of the system.

With reference to the exemplary circuitry illustrated in FIG. 6B, one embodiment of the disclosed DC holding circuitry may include multiple external components (e.g., external transistors and resistors) coupled to an integrated circuit and configured so that power may be selectively and controllably shared between the external components in order to optimize power sharing to dissipate power external to the integrated circuit. In this regard, the exemplary DC holding circuit 600 of FIG. 6B includes multiple power-sharing external resistors (R1, R2, R3, R4 and R5) and multiple power-sharing external transistors (Q3, Q4 and Q5). These components may be controlled, for example, in a current limiting mode of operation to steer and distribute current between the components (e.g., to steer current from transistor Q4 to external resistors R3 and R4, which each may be formed from multiple resistors) so that power may be dissipated external to the integrated circuit. It will be understood that the configuration of power-sharing components illustrated in FIG. 6B is exemplary only, and that other combinations of external power-sharing components may be suitably employed to fit the needs or requirements of a given application.

In the exemplary resistor-based current mirror embodiment of FIG. 6B, multiple resistors R7, R8, R9 and R12 and associated components (e.g., including respective op-amps O1, O3, O4 and O5) are employed for power management reasons. However, it will be understood that a resistor-based current mirror may be configured with greater or lesser number of resistors and their associated components as may be necessary or desired to meet the requirements of a given circuit application. For example, in alternate resistor-based current mirror embodiments, more than four resistors may be employed or less than four resistors may be employed with their associated components.

Unlike the single relatively expensive and higher power external transistor Q4 of prior art DC holding circuit 300 of FIG. 3, multiple external transistors Q4 and Q5 of DC holding circuit 600 may be relatively inexpensive and lower power transistors (e.g., 0.3 W SOT23 packaged transistors) that together cost substantially less than the single higher power (e.g., 1 W SOT223 packaged) transistor Q4 of prior art DC holding circuit 300. Power requirements for external transistors Q4 and Q5 of DC holding circuit 600 are less than external transistor Q4 of prior art DC holding circuit 300 because series resistor R4 and transistor Q5 of circuit 600 are employed to help dissipate power. In this regard, resistor R4 and transistor Q5 may be configured to share power equally or in other suitable proportion. Furthermore, since external transistor Q5 of DC holding circuit 600 is not used to provide a power supply for the integrated circuit, its bias point may be low and may vary as a function of loop current. This extra headroom reduces voltage drop across resistor R4 and transistor Q5 of DC holding circuit 600 to help reduce power consumption for these components for high voltage line conditions (e.g., current limiting region), which is not possible with high power transistor Q4 of prior art DC holding circuit 300. Also illustrated in FIG. 6B are op-amp O6 which may be present to regulate the DCT2 pin and op-amp O7 which may be present to regulate the chip supply (VDD). Although three external power sharing transistors Q3, Q4 and Q5 and five power dissipating resistors R1, R2, R3, R4 and R5 are illustrated in the exemplary embodiment of FIG. 6B, it will be understood that greater or lesser number of power sharing transistors and/or greater or lesser number of power dissipating resistors may be similarly employed in other configurations of the disclosed DC holding circuitry.

In the practice of the disclosed systems and methods, DC holding current may be actively steered into multiple external transistors, e.g., to share the power burden equally or in a substantially equal manner. In one embodiment, this feature may be implemented by using a synthesized inductor to provide an ultra-quiet linear current which may be mirrored to provide desired DC holding characteristics. For example, to obtain low noise characteristics, DC holding circuit 600 of FIG. 6B employs a single op-amp O1 in the place of OA1 and OA2 of the prior art DC holding circuit 300 of FIG. 3. In this regard, op-amp O1 has a large common mode input signal and may be powered from the DCT pin. Op-amp O1, together with transistor M1, resistor R7, capacitor C1 and resistor R2 forms a single op-amp synthesized inductor circuit block 610 as illustrated in FIG. 6B. Although shown formed partially of on-chip and off-chip components in the illustrated embodiment, it will be understood that a synthesized inductor circuit block may be formed entirely on-chip and/or off-chip in any manner suitable (and using any suitable components) for providing the synthesized inductance features described herein. In one embodiment, a need for an ultra-quiet op-amp O1 is driven by the typical noise demands of V.90 and higher compliant modems. Such modems often require a S/N ratio greater than about 75 dB at the phone line. The op-amp noise gain may be approximated by R7/R2*[300 Ω/(R9 ∥R12∥R8)] and in such an embodiment the op-amp O1 should have input noise characteristics that are greater than about 75 dB plus the noise gain. In this regard, care may be taken such that other op-amps of DC holding circuit 600 (e.g., O2 and O4) are configured with sufficiently low noise characteristics so that the phone line S/N ratio is greater than about 75 dB.

As further illustrated in FIG. 6B, active current steering (e.g., using current mirror components M6/M7 to steer current into resistor R3) and variable biasing (e.g., using R11/R11A/GM1/O2/M4) may be employed to permit one or more external resistor/s (e.g., that may include collector resistor/s) to help dissipate power.

For example, in DC holding circuit 600 of FIG. 6B, synthesized inductor circuit block 610 creates a DC signal on the DCT_MIR_1 node that is used to actively steer currents into Q3, Q4 and/or Q5 of FIG. 6B to achieve the DC I–V curve. Current limiting is achieved by turning on op-amp O2 which causes the line voltage to increase by decreasing the current through Q3, Q4 and Q5. Synthesized inductor circuit block 610 also creates a voltage drop DCT_MIR_1 across R7 which is used to mirror current for programmable DC termination. It will be understood that synthesized inductor circuit block 610 may be configured to meet requirements of a given application. For example, synthesized inductor circuit block 610 may be configured in one embodiment to meet the requirements of "low voltage" countries.

In another exemplary embodiment, the DC termination may be programmable by adjusting the DC impedance. In standard modes of operation for FCC standards, the DC impedance presented to the line may be a 50 Ω impedance with a DC I/V curve having 10 mA at approximately 6 volts. For low voltage countries, the DC I/V curve may be shifted downward to operate at lower voltages while still maintaining an approximately 50 Ω impedance. For current limiting countries operating per the CTR21 standard, the DC I/V curve may be changed to a 2000 Ω impedance slope at approximately 40 mA.

Thus, in one exemplary embodiment, the power steering profile of DC holding circuit 600 of FIG. 6B depends on the mode of operation. For example, during standard FCC modes, the ratio of the current steered into the following components of DC holding circuit 600 with respect to the current flowing in R7 may be characterized as follows: 1) current steered into transistor Q4 is approximately equal to $(I_{DCT}*(R7/R8)+I_{CHIP}$, where $I_{CHIP}+I_{DCHOLD}=I_{PHONE\ LINE})$; 2) current steered into transistor Q3 is approximately equal to $(I_{DCT}*(R7/R12)+\text{fixed current})$; and 3) current steered into transistor Q5 is approximately equal to $I_{DCT}*(R7/R9)$, with Q5 sharing its power with R4.

Still referring to FIG. 6B, for programming low voltage modes, the DC I–V curve may be offset downward by adjusting the DC bias point of $V_{BIAS}$ with $R_{BIAS}$ to set the DC bias point of the RX/DCT node. In this regard, $V_{BIAS}$ may be programmably set with a sufficiently large resistance $R_{BIAS}$ to set the DC bias point. Thus, the low voltage mode may be controlled by setting the voltage of the RX/DCT node to meet low voltage requirements of a given country. Additionally, $I_{BIAS}$ may be programmably configured to provide a lowest usable loop current value (i.e., the lowest loop current value where line and chip are operable without collapsing) to meet low current requirements of a given country.

In current limiting modes, the power steering profile of DC holding circuit 600 is identical to FCC mode for low voltages. At the point of the DC I–V curve where current limiting is desired, transistor/resistor components O2-M4-R10 of DC holding circuit 600 slowly start to clamp node DCT_MIR_2 to ground when the line voltage starts to increase, i.e., current limiting, so that current in transistors Q5 and Q3 of DC holding circuit 600 decreases to keep these transistors within power limits. This current is diverted to resistor R3 since the output of op-amp O2 ("ILIM_OP") is applied at the gate of transistor M4A. At the same time, current mirror M6–M7 ensures that some of the current is diverted from transistor Q4 into resistor R3 in order to keep transistor Q4 within its power limit, and trans-impedance amplifier/resistor components GM1/R11/R11A dynamically lift the DCT3 bias point to further assist Q5.

Typical component values for the various capacitors, resistors, and transistors for exemplary DC holding circuit 600 of FIG. 6B are shown in Table 1. The identity and values of the components listed in Table 1 are exemplary only, and it will be understood that benefits of the disclosed systems and methods may be practiced with different combinations of components and/or values thereof.

TABLE 1

DC Holding Circuitry Component Values

| Symbol | Value |
| --- | --- |
| R1 | 536 Ω |
| R2 | 1.07 kΩ |
| R3 | 2.49 kΩ |
| R3A | 100 kΩ |
| R4 | 73.2 Ω |
| R5 | 3.65 kΩ |
| R5A | 150 Ω |
| R6 | 100 kΩ |
| R7 | 416.5 Ω |
| R8 | 180 Ω |
| R9 | 18 Ω (FCC); 45 Ω (CTR21) |
| R10 | 17.5 Ω |
| R11 | 94 kΩ |
| R11A | 106 kΩ |
| R12 | 10 kΩ (FCC); 344 Ω (CTR21) |
| R13 | 3.4 kΩ (FCC); 690 Ω (CTR21) |
| R14 | 478 Ω |
| C1 | 1 µF |
| C2 | 2.7 nF |
| C10 | 0.01 nF |
| GM1 | 5 µA/volt |
| $I_{Chip}$ | 10 mA |
| $I_{Phone\ Line}$ | Approx. 100 mA |

Figure 7:
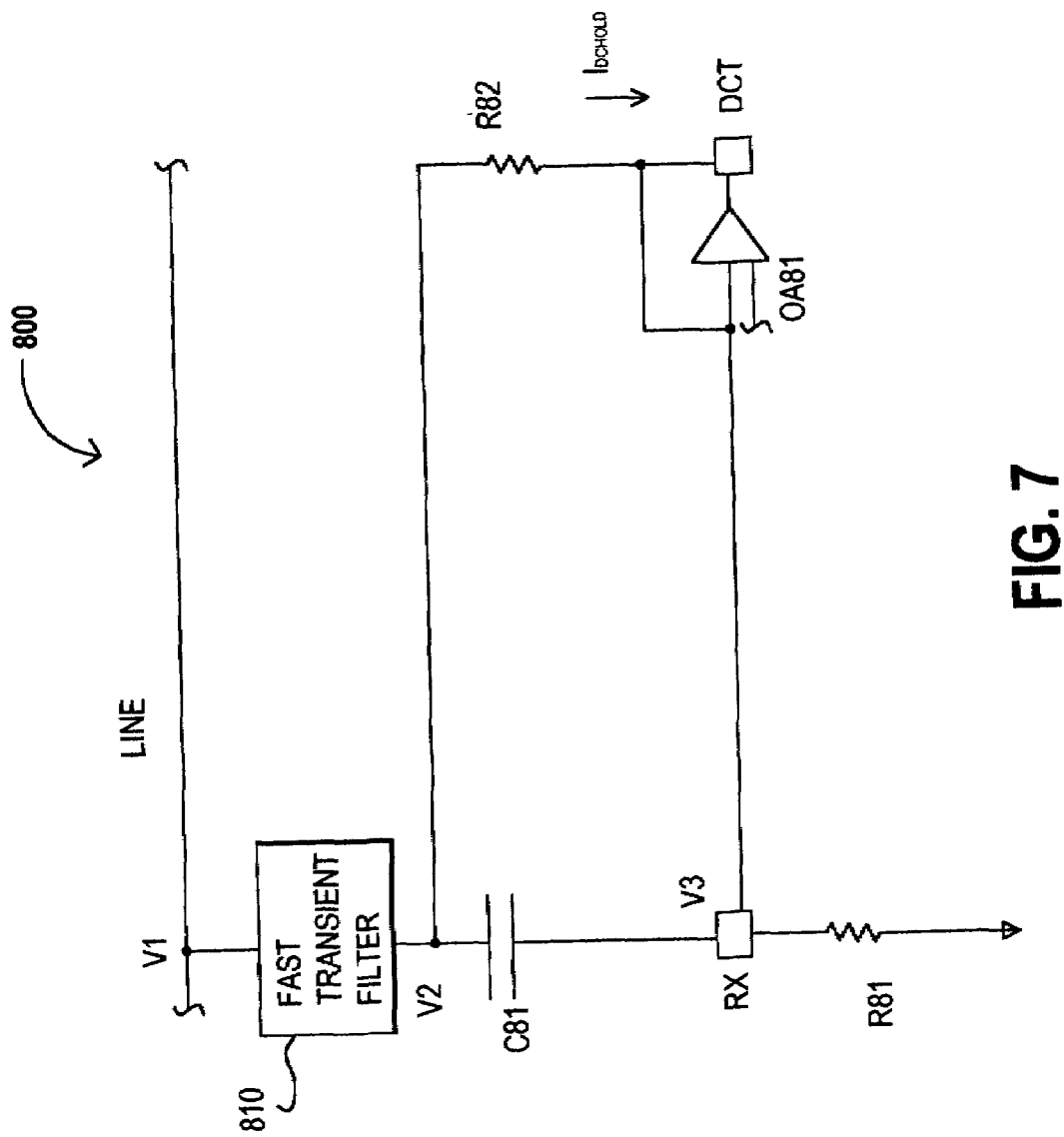
FIG. 7 is a simplified circuit diagram of a fast transient network employing one stage of fast transient filtering according to the disclosed systems and methods.

Fast Off-Hook Settling Network and Input Network Placement of Fast Transient Filter FIG. 7 is a simplified schematic that illustrates components of a fast transient network 800 that may be implemented according to one embodiment of the disclosed systems and methods. As illustrated in FIG. 7, fast transient network 800 employs only one stage of fast transient filtering that includes a fast transient filter circuit block 810 placed in the input network of the DC holding circuit, i.e., coupled in series between the line and a node common to the RX and DCT pins so that filter 810 provides fast transient filtering to the input of both RX and DCT pins and prior to drawing DC holding current $I_{DCHOLD}$ at the DCT pin. This is in contrast to the prior art fast transient network 400 of FIG. 4 in which fast transient filter 410 is coupled in parallel between the line and the RX pin and the line and the DCT pin so that filter 410 only filters the input of the RX pin and does not filter $I_{DCHOLD}$ drawn at the DCT pin. Fast transient filter block 810 may be of any suitable fast transient filter configuration, but in one exemplary embodiment may be a single RC network (although other numbers and/or types of filter networks and combinations thereof may also be suitably employed).

FIG. 7 shows a single fast transient filter circuit block 810 and DC holding current ($I_{DCHOLD}$). The fast transient network components illustrated in FIG. 7 include capacitor C81, resistors R81 and R82, and op amp O81. As shown in FIG. 7, voltage V1 is present at the line side node of fast transient filter circuit block 810; voltage V2 is present at the node between fast transient filter circuit block 810, capacitor C81 and resistor R82; and voltage V3 is present at the node between capacitor C81, resistor R81 and op amp OA81. For the simplified schematic of FIG. 7, the relationship between voltages V1, V2 and V3, and DC holding current ($I_{DCHOLD}$) may be approximated using the following relationships:

$$V2 = V1(1/(1+s\tau_1));$$

$$V3 = V2[s\tau_2/(1+s\tau_2)];$$

and $$I_{DCHOLD} = V2/R82\ [1-(s\tau_2/(1+s\tau_2))] = V1/R82\ [(1/(1+s\tau_1))(1-(s\tau_2/(1+s\tau_2)))]$$

where:

$\tau_1$=Fast Transient Filter≈1/2π(40 khz)

$\tau_2$=DC Holding Frequency≈1/2π(1 hz)

Figure 8:
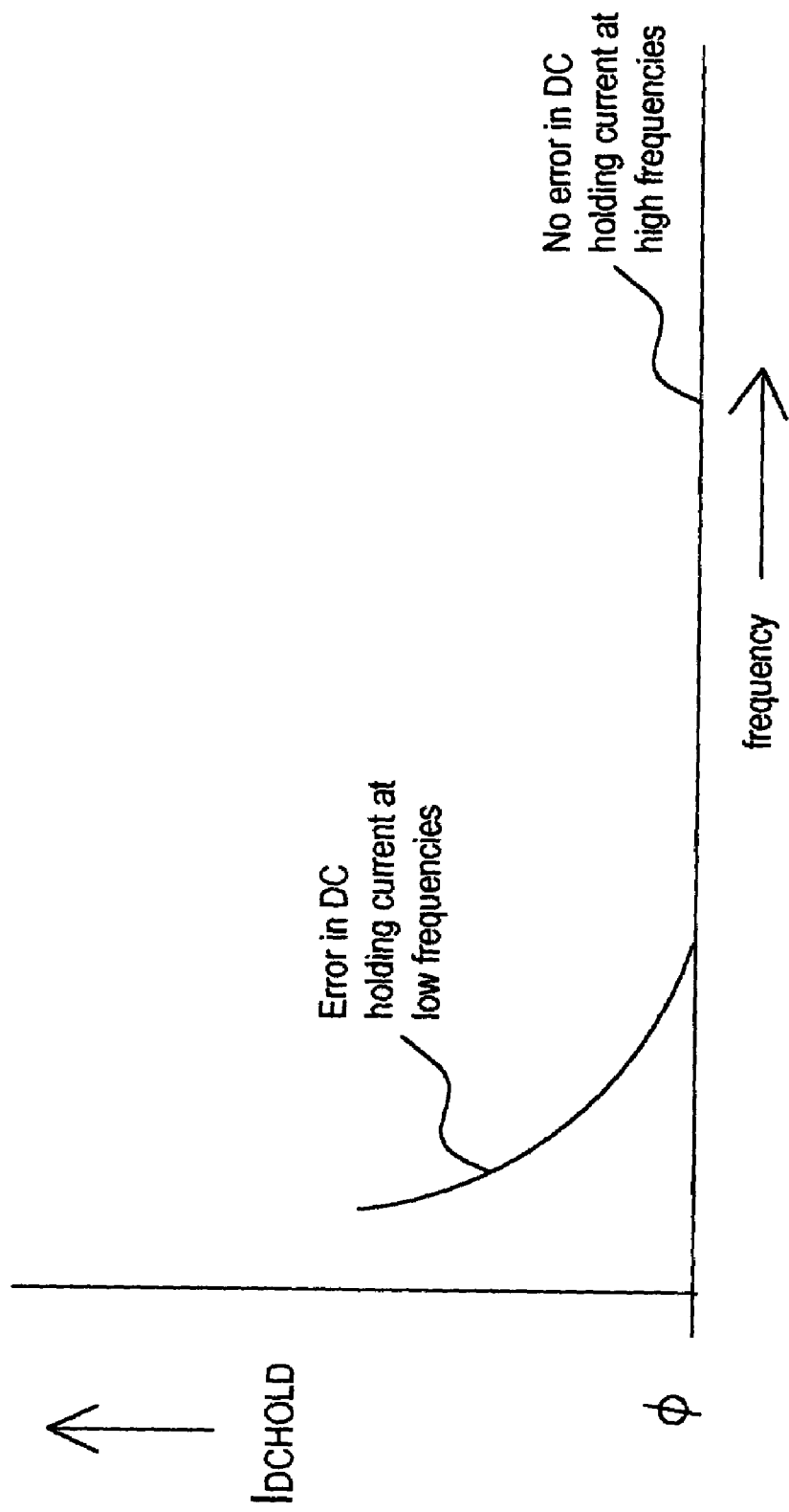
FIG. 8 illustrates relationship between DC holding current and frequency for the simplified fast transient network of FIG. 7 according to one embodiment of the disclosed systems and methods.

FIG. 8 illustrates a relationship between DC holding current and frequency for the simplified fast transient network of FIG. 7 that employs one stage of input network placed fast transient filtering, i.e., fast transient filter circuit block 810. As shown in FIG. 8, fast transient network 800 of FIG. 7 is configured to allow current through R82 to be gained up and used as the DC holding current, resulting in little or substantially no error in DC holding current at high frequencies and meeting AC termination return loss specifications. Therefore, unlike prior art fast transient network 400 of FIG. 4, fast transient network 800 is capable of meeting AC termination return loss specifications with only one stage of fast transient filtering.

Referring now again to FIG. 6B, DC holding circuit 600 employs a fast transient network that includes an input network placed single stage of fast transient filtering. In this regard, single stage fast transient filter circuit block 620 includes a RC filter formed by resistor R1 and capacitor C2.

Still referring to FIG. 6B, DC holding circuit 600 also employs a fast off-hook settling network circuit block 630 that includes op-amp O8 coupled to the RX pin. In the absence of fast off-hook settling network 630, the RX pin node of circuit 600 is high impedance and may swing to very large voltages during initial off-hook conditions since it is not terminated. However, in the illustrated embodiment, bias voltage (RX_CLAMP_SET) of op-amp O8 is set such that pin RX never exceeds the operable voltage limit of the chip. During an offhook event, node RX may get clamped and discharge C1 (e.g., a relatively large 1 μF capacitor in this embodiment), which will result in a relatively slow settling of the steady state value of the RX node. However, certain countries require relatively fast off-hook settling times (e.g., as low as 8 milliseconds). To achieve this fast settling time during a fast off-hook mode, the bias voltage (RX_CLAMP_SET) may be set to the steady state value of RX instead of the minimum operable voltage, ensuring that the final operating point will settle within the required amount of time.

FIG. 9 is a general circuit diagram illustrating an example digital DAA circuitry 110 as it may be implemented to include DC holding circuit 600 of FIG. 6B according to one embodiment of the disclosed systems and methods. In this regard, DC holding circuit 600 may be integrated into phone line side IC 1902B of DAA circuit 110 of FIG. 9, and is shown in FIG. 6B having components coupled to pin connections RX, DCT, DCT2, DCT3, QE, QE2, and QB of phone line side IC 1902B. However, it will be understood that the DAA circuitry of FIG. 9 is exemplary only, and that embodiments of the disclosed DC holding circuitry may be implemented with other DAA circuitry configurations. Examples of such DAA circuitry configurations include, but are not limited to, DAA circuitry described in U.S. Pat. No. 6,385,235 and in U.S. patent application Ser. No. 09/347,688 filed Jan. 2, 1999 and entitled "DIGITAL ACCESS ARRANGEMENT CIRCUITRY AND METHOD HAVING A SYNTHESIZED RINGER IMPEDANCE FOR CONNECTING TO PHONE LINES" by Tuttle et al., the disclosure of each being incorporated herein by reference. Other examples of DAA circuit types with which the disclosed DC holding circuitry may be employed include, but are not limited to, DAA circuits that do not utilize capacitance isolation as would be recognized by those of skill in the art with benefit of this disclosure.

DAA circuit 110 of FIG. 9 includes two integrated circuits (ICs), a capacitive isolation barrier 120, and may be coupled to phone line TIP and RING lines as shown. In the illustrated embodiment of FIG. 9, powered side circuitry 116 may include a powered side IC 1902A, and telephone line side circuit 118 may include a phone line side IC 1902B. External discrete devices may be coupled to the TIP line, RING line, phone line side IC 1902B and powered side IC 1902A. The external circuitry may include circuitry, such as hookswitch circuitry and diode bridge circuitry 1906.

In the exemplary DAA circuitry embodiment depicted in FIG. 9, external pins 1909 of the powered side IC 1902A are connected to an external digital signal processor (DSP) and/or to an external application specific IC (ASIC) or controller. The isolation barrier 120 includes a first barrier capacitor (C1) connecting an external signal (C1A) pin on the powered side IC 1902A to an external signal (C1B) pin on the phone line side IC 1902B. In addition, the isolation barrier 120 has a second barrier capacitor (C2) connecting an external signal (C2A) pin on the powered side IC 1902A to an external signal (C2B) pin on the phone line side IC 1902B. In the embodiment of FIG. 9, differential signals across capacitors C1 and C2 may be used to communicate between IC 1902A and IC 1902B. The ground (GND) pin of powered side IC 1902A may be connected to the system digital ground. Regulator voltage reference (VA) pin of powered side IC 1902A may be connected to external capacitor C51 and serve as the reference for the internal voltage regulator. Digital supply voltage (VDD) pin may be present on powered side IC 1902A to provide digital supply voltage (e.g., 3.3 V) to powered side IC 1902A. In addition, the isolated ground (IGND) pin of phone line side IC 1902B may be connected to a node within diode circuitry 1906 (and thereby be connected to the phone line). Also shown is external line side capacitor C3 that is coupled between tip and ring of telephone line side circuit 118 and phone line side IC 1902B, with diodes of diode bridge circuitry 1906 being coupled between the tip and ring and external line side capacitor C3. In one exemplary embodiment, external line side capacitor C3 may be a capacitor having a breakdown voltage of about 300 volts, although capacitors having other breakdown voltage values are possible in other embodiments. Typical component values for the various external capacitors, resistors, transistors, and diodes for exemplary DAA circuit of FIG. 9 are shown in Table 2. The identity and values of the components listed in Table 2 are exemplary only, and it will be understood that benefits of the disclosed DC holding systems and methods may be practiced with different combinations of components and/or values thereof.

TABLE 2

External Component Values for DAA Circuit of FIG. 9

| Component | Value |
| --- | --- |
| C1, C2 | 33 pF, Y2, X7R, ±20% |
| C3 | 3.9 nF, 250 V, X7R, ±20% |
| C4 | 1.0 uF, 50 V, Elec/Tant, ±20% |
| C5, C6, C50, C51 | 0.1 uF, 16 V, X7R, ±20% |
| C7 | 2.7 nF, 50 V, X7R, 20% |
| C8, C9 | 680 pF, Y2, X7R, ±10% |
| C10 | 0.01 uF, 16 V, X7R, ±20% |
| D1, D2 | Dual Diode, 225 mA, 300 V, CMPD2004 |
| FB1, FB2 | Ferrite Bead, BLM31A601S |
| Q1, Q3 | NPN, 300 V, MMBTA42 |
| Q2 | PNP, 300 V, MMBTA92 |
| Q4, Q5 | NPN, 60 V, 330 mW, MMBT2484 |
| RV1 | Sidactor, 275 V, 100 A |
| R1 | 1.07 KΩ, ½ W, 1% |
| R2 | 150 Ω, ⅟₁₆ W, 5% |
| R3 | 3.65 kΩ, ½ W, 1% |
| R4 | 2.49 KΩ, ½ W, 1% |
| R5, R6 | 100 KΩ, ⅟₁₆ W, 5% |
| R7, R8 | 20 MΩ, ⅟₁₆ W, 5% |
| R9 | 1 MΩ, ⅟₁₆ W, 1% |
| R10 | 536 Ω, ¼ W, 1% |
| R11 | 73.2 Ω, ½ W, 1% |
| R51, R52, R53, R54, R55 | 4.7 KΩ, ⅟₁₀ W, 5% |
| Z1 | Zener Diode, 43 V, ½ W, BZX52C43 |

In the embodiment illustrated and described above with respect to FIGS. 6 and 9, DC holding circuit 600 is shown partially integrated into a phone line side IC of DAA circuitry, in this case phone line side IC 1902B of DAA circuitry of FIG. 9. However, it will be understood that in other embodiments the disclosed DC holding circuitry may be implemented in any manner suitable for achieving one or more of the features described herein, e.g., as circuitry external to a phone line IC, as circuitry entirely integrated into a phone line IC, etc. It will be also understood that other components may be optionally present within the disclosed DC holding circuit as necessary or desired to fit particular applications or to achieve particular capabilities.

Although described herein with respect to the exemplary embodiment of FIGS. 6 and 9, it will be understood that the disclosed DC holding circuit and method for use thereof may be employed in any DAA circuit configuration to independently or cooperatively achieve one or more of the features described herein, e.g., to implement programmable current limiting, fast settling time and/or low noise/distortion with reduced component complexity and cost, etc. In this regard, it will be understood that the typical internal and external component values disclosed herein are exemplary only. Furthermore, in the practice of the disclosed DC holding circuitry and methods of use thereof, the number, type and/or configuration of internal and/or external components (e.g., resistors, op-amps, transistors, capacitors, etc.) may be varied to achieve one or more characteristics of a DC holding circuit as may be desirable to fit a particular application/s. For example, it will be understood that in other embodiments the disclosed systems and methods may be practiced with DAA circuitry having only one barrier capacitor, having more than two barrier capacitors, and/or having isolation elements other than capacitors.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention. Moreover, the various aspects of the inventions disclosed herein may be used in combination or separately as will also be apparent to those skilled in the art.

We claim:

1. A communication system, comprising:
   phone line side circuitry that may be coupled to a telephone network; and
   a DC holding circuit within the phone line side circuitry, said DC holding circuit comprising resistor-based current mirror circuitry having at least one op-amp;
   wherein an output current of said resistor-based current mirror circuitry is proportional to an input current of said resistor-based current mirror circuitry based on a ratio of resistance values between resistors of said resistor-based current mirror circuitry.

2. The communication system of claim 1, wherein said phone line circuitry further comprises a phone line side integrated circuit that comprises said resistor-based current mirror circuitry and at least one DC termination pin configured to be coupled to said telephone network; and wherein said resistor-based current mirror circuitry comprises at least one resistor operably coupled to said DC termination pin, said resistor-based current mirror circuitry being configured to selectively discharge DC holding current from said DC termination pin through said at least one resistor.

3. The communication system of claim 2, wherein said phone line side integrated circuit comprises two or more DC termination pins configured to be coupled to said telephone network; and wherein said resistor-based current mirror circuitry comprises at least one respective resistor operably coupled to each of said DC termination pins, said resistor-based current mirror circuitry being configured to selectively discharge DC holding current from each of said DC termination pins through said at least one resistor coupled to each of said respective DC termination pins.

4. The communication system of claim 2, wherein said DC holding circuit further comprises two or more external power sharing transistors, said two or more external power sharing transistors including a first external transistor configured to be coupled between said telephone network and said at least one DC termination pin of said phone line integrated circuit, and a second external transistor configured to be coupled between said telephone network and at least one other pin of said phone line integrated circuit, said resistor-based current mirror circuitry being configured to actively and selectively steer DC holding current into said first and second external power sharing transistors.

5. The communication system of claim 4, wherein said resistor-based current mirror circuitry is configured to actively and selectively steer DC holding current into said first and second external power sharing transistors by selectively discharging DC holding current from said DC termination pin through said at least one resistor.

6. The communication system of claim 4, wherein said DC holding circuit further comprises at least one external resistor coupled between said first external power sharing transistor and said second external power sharing transistor, and wherein in a current limiting mode said resistor-based current mirror circuit is configured to dissipate power external to said phone line integrated circuit by actively and selectively steering DC holding current away from said second external transistor through said at least one external resistor and to said first external transistor.

7. The communication system of claim 1, wherein said phone line circuitry further comprises a phone line side integrated circuit that comprises said resistor-based current mirror circuitry and having a receive side pin and a first DC termination pin each configured to be coupled to said telephone network; and wherein said phone line circuitry further comprises a synthesized inductor circuit operably coupled to said receive side pin of said phone line integrated circuit, to said first DC termination pin of said phone line integrated circuit, and to a first current mirror node of said resistor-based current mirror circuitry.

8. The communication system of claim 7, wherein said DC holding circuit further comprises a single external capacitor configured to be coupled between the telephone network and said receive side pin of said phone line integrated circuit.

9. The communication system of claim 1, further comprising powered side circuitry coupled to the phone line side circuitry through an isolation barrier.

10. The communication system of claim 9, wherein said isolation barrier comprises a capacitive barrier coupled between the phone line side circuitry and the powered side circuitry.

11. A communication system, comprising:
   phone line side circuitry that may be coupled to a telephone network;
   powered side circuitry that may be coupled to the phone line side circuitry through an isolation barrier; and
   a DC holding circuit within the phone line side circuitry, said DC holding circuit comprising non-filtered current mirror circuitry and a synthesized inductor circuit;
   wherein an output current of said current mirror circuitry varies proportionally to an input current of said current mirror circuitry.

12. The communication system of claim 11, wherein said DC holding circuit is programmable; and wherein said current mirror circuitry comprises a non-filtered current routing circuit configured to actively and selectively steer DC current into multiple external components of said programmable DC holding circuit.

13. The communication system of claim 12, wherein said current mirror circuitry comprises a high bandwidth current routing circuit; and wherein said synthesized inductor circuit is configured to sense current.

14. The communication system of claim 12, wherein said current routing circuitry of said programmable DC holding circuit is programmable to provide compatibility with two or more international telephone interface standards.

15. The communication system of claim 11, wherein said phone line circuitry further comprises a phone line side integrated circuit that comprises said current mirror circuit, and that has a receive side pin and a first DC termination pin configured to be coupled to said telephone network; and wherein said synthesized inductor circuit is configured to selectively discharge DC holding current from said DC termination pin.

16. The communication system of claim 15, wherein said phone line circuitry further comprises a phone line side integrated circuit that comprises said current mirror circuit, and that has a receive side pin and a first DC termination pin configured to be coupled to said telephone network; and wherein said synthesized inductor circuit is operably coupled to said receive side pin of said phone line integrated circuit, to said first DC termination pin of said phone line integrated circuit, and to a first current mirror node of said current mirror circuit.

17. The communication system of claim 16, wherein said DC holding circuit further comprises a single external capacitor configured to be coupled between the telephone network and said receive side pin of said phone line integrated circuit.

18. The communication system of claim 16, wherein said synthesized inductor circuit comprises a first op-amp, said first op-amp comprising an ultra-quiet op-amp having pin noise characteristics greater than about 75 dB plus the noise gain.

19. The communication system of claim 16, wherein said DC holding circuit further comprises two or more external power sharing transistors, said two or more external power sharing transistors including a first external transistor configured to be coupled between said telephone network and a DC termination pin of said phone line integrated circuit, and a second external transistor configured to be coupled between said telephone network and at least one other pin of said phone line integrated circuit, said synthesized inductor circuit being configured to actively and selectively steer DC holding current into said first and second external power sharing transistors by creating a DC signal on said first current mirror node.

20. The communication system of claim 19, wherein said DC holding circuit further comprises a second op-amp having an op-amp input coupled to a second current mirror node, said second current mirror node being coupled to said first current mirror node, and said second op-amp being configured to selectively control current flow through at least one of said two or more external power sharing transistors; and wherein said synthesized inductor circuit is configured to activate said second op-amp to selectively limit DC holding current flow into said two or more external power sharing transistors by said DC signal created on said first current mirror node.

21. The communication system of claim 19, wherein said DC holding circuit further comprises at least one external resistor coupled between said first external transistor and said second external transistor, and wherein in a current limiting mode said synthesized inductor circuit is configured to dissipate power external to said phone line integrated circuit by using said DC signal created on said first current mirror node to actively and selectively steer DC holding current away from said second external transistor through said at least one external resistor and to said first external transistor.

22. The communication system of claim 11, wherein said synthesized inductor circuit is configured to meet requirements of "low voltage" countries.

23. The communication system of claim 16, wherein said synthesized inductor circuit comprises an op-amp, a transistor and a resistor; wherein said transistor is coupled between said DC termination pin and said first current mirror node; wherein a first input of said op-amp is coupled to said receive side pin, a second input of said op-amp is coupled between said first DC termination pin and said transistor, and an output of said op-amp is coupled to a gate of said transistor; and wherein said resistor is coupled between said first current mirror node and ground.

24. The communication system of claim 11, further comprising powered side circuitry coupled to the phone line side circuitry through an isolation barrier.

25. The communication system of claim 24, wherein said isolation barrier comprises a capacitive barrier coupled between the phone line side circuitry and the powered side circuitry.

26. The communication system of claim 11, wherein said DC holding circuit further comprises resistor-based current mirror circuitry.

27. The communication system of claim 11, wherein said synthesized inductor circuit comprises a single op-amp synthesized inductor circuit.

28. A method of operating a communication system that may be coupled to a telephone network, comprising:
providing phone line side circuitry that includes a DC holding circuit and at least one DC termination pin configured to be coupled to said telephone network, said DC holding circuit comprising resistor-based current mirror circuitry having at least one op-amp and having at least one resistor operably coupled to said DC termination pin; and
selectively discharging DC holding current from said DC termination pin through said at least one resistor of said resistor-based current mirror circuitry;
wherein said discharged DC holding current is proportional to an input current of said resistor-based current mirror circuitry based on a ratio of resistance values between resistors of said resistor-based current mirror circuitry.

29. The method of claim 28, wherein said phone line circuitry further comprises a phone line side integrated circuit that comprises said resistor-based current mirror circuitry and said at least one DC termination pin.

30. The method of claim 29, wherein said phone line side integrated circuit comprises two or more DC termination pins configured to be coupled to said telephone network, and said resistor-based current mirror circuitry comprises at least one respective resistor operably coupled to each of said DC termination pins; and wherein said method further comprises selectively discharging DC holding current from each of said DC termination pins through said at least one resistor coupled to each of said respective DC termination pins.

31. The method of claim 29, wherein said DC holding circuit further comprises two or more external power sharing transistors, said two or more external power sharing transistors including a first external transistor configured to be coupled between said telephone network and said at least one DC termination pin of said phone line integrated circuit; and a second external transistor configured to be coupled between said telephone network and at least one other pin of said phone line integrated circuit; and wherein said method further comprises actively and selectively steering DC holding current into said first and second external power sharing transistors.

32. The method of claim 31, further comprising actively and selectively steering DC holding current into said second external power sharing transistors by selectively discharging DC holding current from said DC termination pin through said at least one resistor.

33. The method of claim 31, wherein said DC holding circuit further comprises at least one external resistor coupled between said first external power sharing transistor and said second external power sharing transistor; and wherein said method further comprises operating in a current limiting mode by dissipating power external to said phone line integrated circuit by actively and selectively steering DC holding current away from said second external transistor through said at least one external resistor and to said first external transistor.

34. The method of claim 28, wherein said phone line circuitry further comprises a phone line side integrated circuit that comprises said resistor-based current mirror circuitry and having a receive side pin and a first DC termination pin each configured to be coupled to said telephone network; and wherein said phone line circuitry further comprises a synthesized inductor circuit operably coupled to said receive side pin of said phone line integrated circuit, to said first DC termination pin of said phone line integrated circuit, and to a first current mirror node of said resistor-based current mirror circuitry.

35. The method of claim 34, wherein said DC holding circuit further comprises a single external capacitor configured to be coupled between the telephone network and said receive side pin of said phone line integrated circuit.

36. The method of claim 28, wherein said communication system further comprises powered side circuitry coupled to the phone line side circuitry through an isolation barrier.

37. The method of claim 36, wherein said isolation barrier comprises a capacitive barrier coupled between the phone line side circuitry and the powered side circuitry.

38. A method of operating a communication system that may be coupled to a telephone network, comprising:
providing phone line side circuitry that includes a DC holding circuit and that has a receive side pin and a first DC termination pin each configured to be coupled to said telephone network, said DC holding circuit comprising non-filtered current mirror circuitry and a synthesized inductor circuit; and
selectively discharging DC holding current from said DC termination pin;
wherein said discharged DC holding current varies proportionally to an input current of said current mirror circuitry.

39. The method of claim 38, wherein said phone line circuitry further comprises a phone line side integrated circuit that comprises said current mirror circuit; and wherein said synthesized inductor circuit is operably coupled to said receive side pin of said phone line integrated circuit, to said first DC termination pin of said phone line integrated circuit, and to a first current mirror node of said current mirror circuit.

40. The method of claim 39, wherein said DC holding circuit further comprises a single external capacitor configured to be coupled between the telephone network and said receive side pin of said phone line integrated circuit.

41. The method of claim 39, wherein said synthesized inductor circuit comprises a first op-amp, said first op-amp comprising an ultra-quiet op-amp having pin noise characteristics greater than about 75 dB plus the noise gain.

42. The method of claim 39, wherein said DC holding circuit further comprises two or more external power sharing transistors, said two or more external power sharing transistors including a first external transistor configured to be coupled between said telephone network and said second DC termination pin of said phone line integrated circuit; and a second external transistor configured to be coupled between said telephone network and at least one other pin of said phone line integrated circuit; and wherein said method further comprises actively and selectively steering DC holding current into said first and second external power sharing transistors by creating a DC signal on said first current mirror node.

43. The method of claim 42, wherein said DC holding circuit further comprises a second op-amp having an input coupled to a second current mirror node, said second current mirror node being coupled to said first current mirror node; and wherein said method further comprises selectively controlling current flow through at least one of said two or more external power sharing transistors, and activating said second op-amp to selectively limit DC holding current flow into said two or more external power sharing transistors by said DC signal created on said first current mirror node.

44. The method of claim 42, wherein said DC holding circuit further comprises at least one external resistor coupled between said first external transistor and said second external transistor; and wherein said method further comprises in a current limiting mode dissipating power external to said phone line integrated circuit by using said DC signal created on said first current mirror node to actively and selectively steer DC holding current away from said second external transistor through said at least one external resistor and to said first external transistor.

45. The method of claim 38, wherein said synthesized inductor circuit is configured to meet requirements of "low voltage" countries.

46. The method of claim 39, wherein said synthesized inductor circuit comprises an op-amp, a transistor and a resistor; wherein said transistor is coupled between said first DC termination pin and said first current mirror node; wherein a first input of said op-amp is coupled to said receive side pin, a second input of said op-amp is coupled between said first DC termination pin and said transistor, and an output of said op-amp is coupled to a gate of said transistor; and wherein said resistor is coupled between said first current mirror node and ground.

47. The method of claim 38, wherein said communication system further comprises powered side circuitry coupled to the phone line side circuitry through an isolation barrier.

48. The method of claim 47, wherein said isolation barrier comprises a capacitive barrier coupled between the phone line side circuitry and the powered side circuitry.

49. The method of claim 38, wherein said DC holding circuit further comprises resistor-based current mirror circuitry; and wherein said method further comprises selectively discharging DC holding current from said DC termination pin through said at least one resistor of said resistor-based current mirror circuitry.

50. A DC holding circuit, comprising:
a synthesized inductor; and
a current routing circuit coupled to said synthesized inductor;
wherein said current routing circuit is non-filtered and is configured to steer DC current into multiple components of said DC holding circuit to maximize power handling within said DC holding circuit.

51. The DC holding circuit of claim 50, wherein said current routing circuit is programmable to provide compatibility with two or more different international telephone interface standards.

* * * * *